US012744721B2

(12) United States Patent
Rajamanickam et al.

(10) Patent No.: US 12,744,721 B2
(45) Date of Patent: Sep. 22, 2026

(54) SYSTEM AND METHOD OF DISCOVERING AND VALIDATING DIFFERENT NETWORK ACTION HARDWARE CAPABILITIES

(71) Applicant: Cisco Technology, Inc., San Jose, CA (US)

(72) Inventors: Jaganbabu Rajamanickam, Kanata (CA); Rakesh Gandhi, Stittsville (CA); Nagendra Kumar Nainar, Morrisville, NC (US); Madhan Sankaranarayanan, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 18/360,700

(22) Filed: Jul. 27, 2023

(65) Prior Publication Data

US 2024/0195725 A1 Jun. 13, 2024

(30) Foreign Application Priority Data

Dec. 9, 2022 (IN) ............................. 202221071037

(51) Int. Cl.
*H04L 43/12* (2022.01)
*H04L 45/00* (2022.01)
*H04L 45/50* (2022.01)

(52) U.S. Cl.
CPC .............. *H04L 43/12* (2013.01); *H04L 45/20* (2013.01); *H04L 45/50* (2013.01)

(58) Field of Classification Search
CPC ......... H04L 43/10; H04L 43/12; H04L 45/20; H04L 45/50
See application file for complete search history.

(56) References Cited

U.S. PATENT DOCUMENTS 10,270,691 B2 * 4/2019 Nainar .................... H04L 45/64
10,979,350 B1 * 4/2021 Nainar .................. H04L 45/507

(Continued)

OTHER PUBLICATIONS

Andersson L., et al., "MPLS MNA Operational Architecture draft-andersson-mpls-mna-operation-architecture-00", draft-andersson -mpls-mna-operation-architecture-00.txt, Internet-draft, Abstract, Internet Engineering Task Force, Sep. 26, 2022, pp. 1-14, XP015154078, Retrieved from https://tools.ietf.org/html/draft-andersson-mpls-mna-operation-architecture-00 on Sep. 26, 2022, The Whole Document.

(Continued)

*Primary Examiner* — Angela Widhalm De Rodriguez
(74) *Attorney, Agent, or Firm* — Polsinelli P.C.

(57) ABSTRACT

Systems and methods for validating a hardware path capability are provided. The method includes generating, at an ingress node of a network, an operations, administration and maintenance (OAM) probe packet having an OAM bit set associated with validating the hardware path capability, wherein the OAM probe packet comprises a plurality of features; indicating, by each respective intermediate node of a plurality of intermediate nodes in the network along a network path and as instructed by the OAM bit set, whether the respective intermediate node can support the respective feature of the plurality of features; generating, at an egress node associated with the network path, a report regarding whether the plurality of intermediate nodes can support each respective feature of the plurality of features within the OAM probe packet; and determining, based on the report, whether to enable customer traffic implementing the plurality of features along the network path.

20 Claims, 22 Drawing Sheets

(56) References Cited

U.S. PATENT DOCUMENTS

| | | | | |
|---|---|---|---|---|
| 2017/0222864 | A1 | 8/2017 | Wang et al. | |
| 2018/0331933 | A1 | 11/2018 | Song | |
| 2021/0092052 | A1* | 3/2021 | Tantsura | H04L 45/24 |
| 2021/0092055 | A1* | 3/2021 | Huang | H04L 45/28 |
| 2021/0135986 | A1 | 5/2021 | Song et al. | |
| 2021/0243117 | A1 | 8/2021 | Gandhi et al. | |
| 2022/0086078 | A1* | 3/2022 | Sivabalan | H04L 45/34 |
| 2023/0031423 | A1* | 2/2023 | Gandhi | H04L 45/24 |

OTHER PUBLICATIONS

Andersson L., et al., "MPLS Network Actions Framework draft-ietf-mpls-mna-fwk-02", draft-ietf-mpls-mna-fwk-02.txt, Internet-draft, MPLS Working Group, Internet Engineering Task Force, Standardworkingdraft, Internet SOC, No. 2, Oct. 21, 2022, pp. 1-18, XP015154695, Retrieved from https://tools.ietf.org/html/draft-ietf-mpls-mna-fwk-02 on Oct. 21, 2022, The Whole Document.

International Search Report and Written Opinion for International Application No. PCT/US2023/082217, mailed Mar. 13, 2024, 15 Pages.

Kini S., et al., "Entropy Label for Source Packet Routing in Networking (SPRING) Tunnels", rfc8662.txt, Internet Engineering Task Force, Standard, Internet Society (ISOC) 4, Rue Des Falaises CH-1205 Geneva, Switz, Dec. 6, 2019, pp. 1-14, XP015136735, Retrieved from https://tools.ietf.org/html/rfc8662 on Dec. 6, 2019, cited in the application, sections 4 and 5.

Rajamanickam J., et al., "MPLS Network Action (MNA) Header Encodings draft-jags-mpls-mna-hdr-03", draft-jags-mpls-mna-hdr-03.txt, Internet Engineering Task Force, Standardworkingdraft, Internet Society (ISOC) 4, Rue, No. 3, Nov. 5, 2022, pp. 1-32, XP015156417, Retrieved from https://tools.ietf.org/html/draft-jags-mpls-mna-hdr-03 on Nov. 6, 2022, sections 1, 4, 5, 5.1, 5.2.1 to 5.2.6, 6.1 to 6.3, 9 and 11.

* cited by examiner

MNA SUB-STACK EXAMPLE FORMAT
202

MNA SUB-STACK WITH FLAG-BASED NAI WITH NO DATA
302

MNA SUB-STACK WITH FLAG-BASED NAIS WITH ANCILLARY DATA
402

MNA SUB-STACK WITH FIXED ENTROPY LABEL
502

MNA HEADER CARRYING SLICE IDENTIFIER
602

MNA HEADER CARRYING ENTROPY LABEL WITH OPERATIONS CODE
702

MNA SUB-STACK WITH OAM FLAGS
802

MNA SUB-STACK WITH FLAG-BASED NAIS WITH NO ANCILLARY DATA AND OAM FLAGS
902

MNA SUB-STACK WITH FLAG-BASED NAIS WITH ANCILLARY DATA AND OAM FLAG
1002

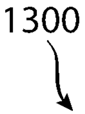
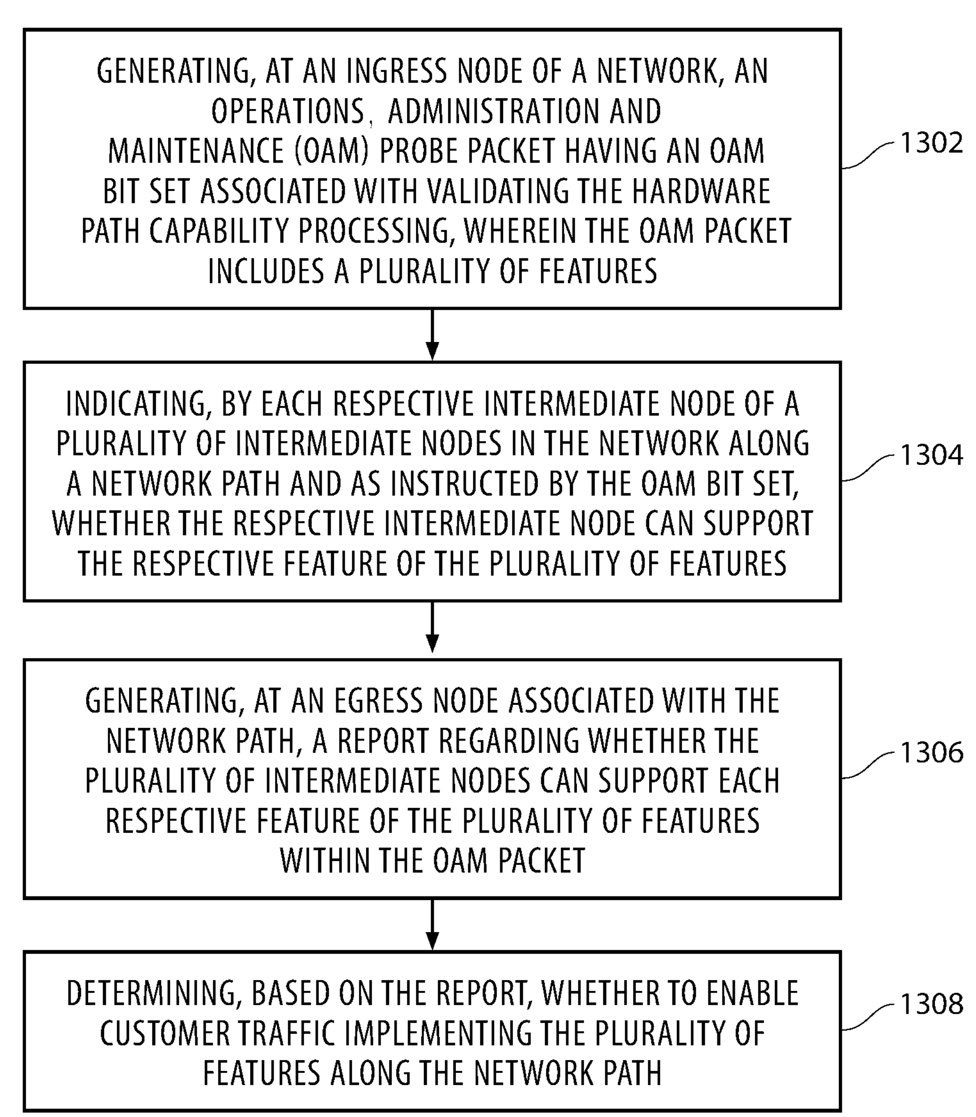
FIG. 13

Figure 16:
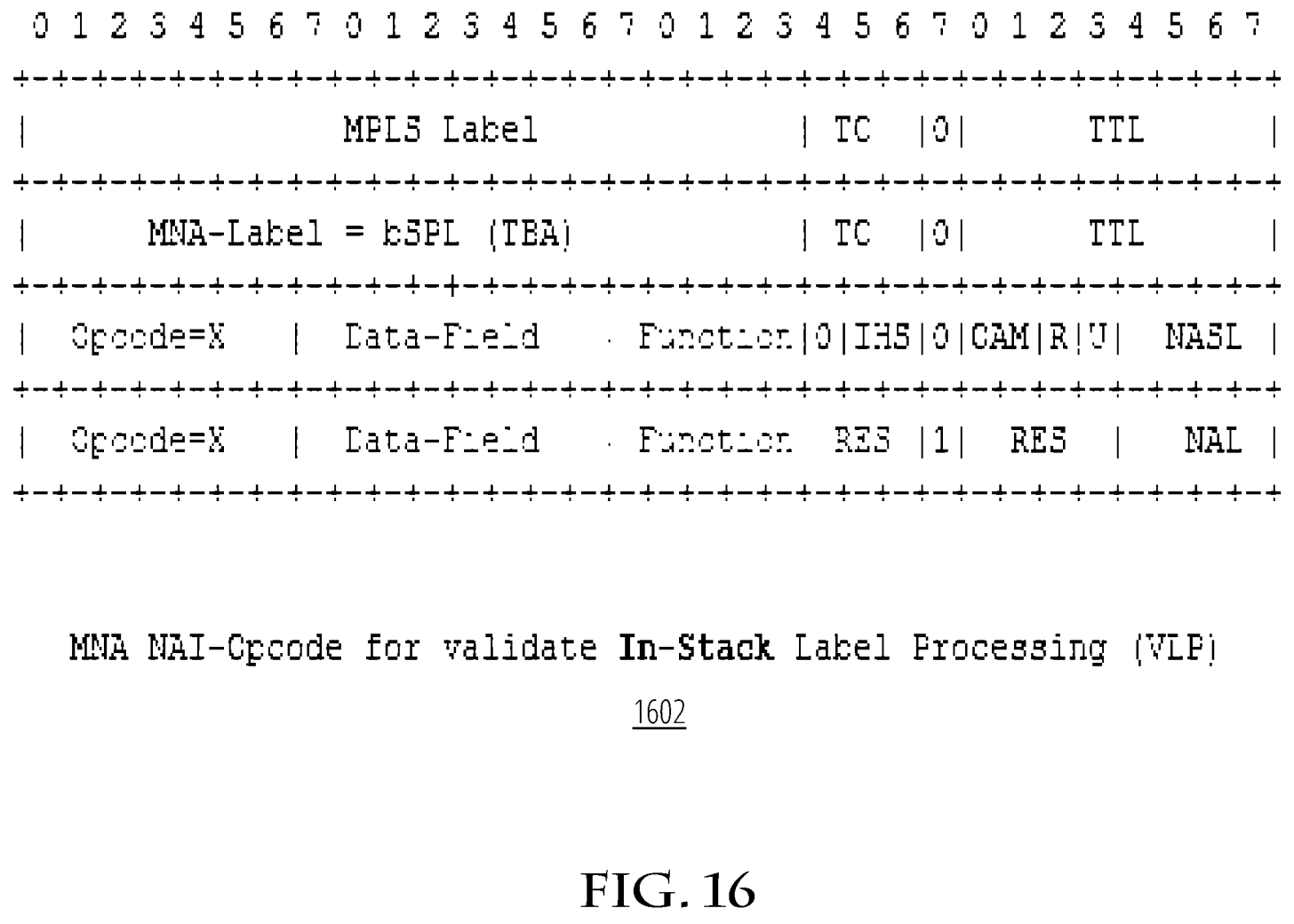

```
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|                MPLS Label                     | TC  |0|   TTL       |
+-+-+-+-+-+-+-+-+-+-+-+-+-+-+-+-+-+-+-+-+-+-+-+-+-+-+-+-+-+-+-+-+
|     MNA-Label = bSPL (TBA)                    | TC  |0|   TTL       |
+-+-+-+-+-+-+-+-+-+-+-+-+-+-+-+-+-+-+-+-+-+-+-+-+-+-+-+-+-+-+-+-+
|  Opcode=X   |  Data-Field   . Function|0|IHS|0|CAM|R|U|  NASL |
+-+-+-+-+-+-+-+-+-+-+-+-+-+-+-+-+-+-+-+-+-+-+-+-+-+-+-+-+-+-+-+-+
|  Opcode=X   |  Data-Field   . Function  RES |1|  RES   |   NAL |
+-+-+-+-+-+-+-+-+-+-+-+-+-+-+-+-+-+-+-+-+-+-+-+-+-+-+-+-+-+-+-+-+
```

MNA NAI-Opcode for validate In-Stack Label Processing (VLP)

SYSTEM AND METHOD OF DISCOVERING AND VALIDATING DIFFERENT NETWORK ACTION HARDWARE CAPABILITIES

PRIORITY CLAIM

The present application claims priority to India Provisional Patent Application No. 2022/21071037 filed on Dec. 9, 2022, the contents of which are incorporated herein by reference.

BACKGROUND

The next-generation 5G networks are expected to provide services that can meet strict service level agreements (SLAs) needed for advanced 5G use-cases which rely on enhanced mobile broadband, ultra-reliable low latency communication and massive machine-type data exchange. These 5G networks enable new use-cases such as autonomous connected cars, remote health care, modernized IOT-based industries, distant learning, public safety, smart cities, to name a few.

A next-generation multiprotocol label switching (MPLS) approach is termed "MPLS network actions (MNA)" which enables MPLS/SR (segment routing)/EVPN (Ethernet virtual private network) networks with new applications such as network slicing, time-sensitive networks (TSN) (for delay-bound applications), advanced In-Situ operations, administration, and maintenance (IOAM), Service Assurance (SA), and performance measurement (PM), advanced telemetry, path tracing (PT), equal-cost multi-path (ECMP) load-balancing, etc. For example, the PM technology includes but is not limited to measuring latency, packet loss, liveness detection, and tracing path of a flow. These capabilities enable service providers to guarantee strict SLAs needed for the advanced 5G use-cases.

Segment-routing (SR) technology greatly simplifies network operations and is conducive to a Software-Defined Networking paradigm. Segment Routing may be utilized with both MultiProtocol Label Switching (SR-MPLS) and Internet Protocol version 6 (SRv6) data-planes. Segment Routing policies are used to steer traffic through a specific, user-defined path using one or more Segment Identifier (SID) list for Traffic Engineering (TE) purpose. In the case of SR-MPLS TE Policy, a stack of SR-MPLS Labels is added on the packets by the ingress node of the SR Policy.

There are OAM (operations, administration, and maintenance) tools like MPLS ping/traceroute/tree-races which are control plane based and that are limited in their functions. These tools do not alleviate the potential for traffic disruption due to different hardware capabilities.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 13 illustrates an example method according to an aspect of this disclosure.

FIG. 16 illustrates opcodes for validating using an in-stack label processing approach in accordance with one embodiment.

BRIEF INTRODUCTION

Figure 1:
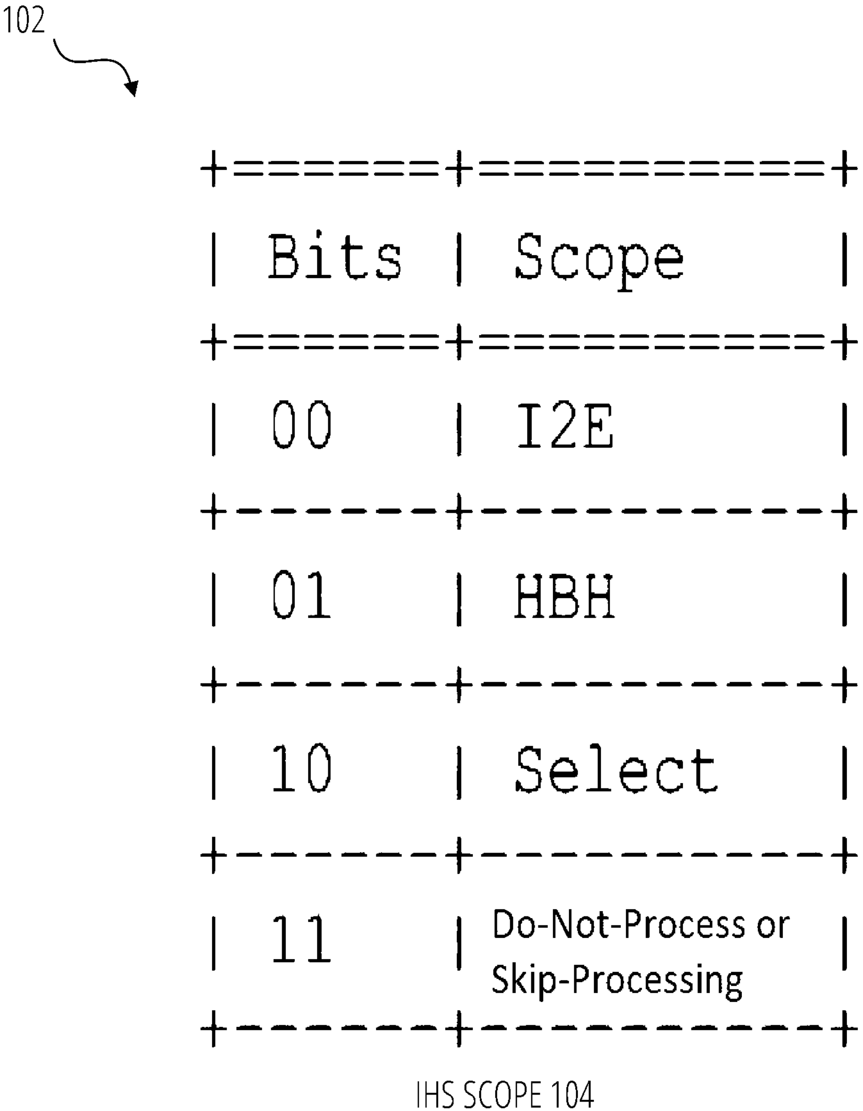
FIG. 1 illustrates an ingress-to-egress, hop-by-hop and select scope (IHS) table in accordance with an aspect of this disclosure.

As noted above, none of the existing OAM tools can avoid traffic disruption. This is because the tools fail to provide an ability to discover and verify hardware capability as packets traverse from node to node in a network. For example, each respective node may have different capabilities with respect to being able to perform multiprotocol label switching (MPLS) network actions (MNA). Furthermore, MNA refers to a new infrastructure and the OAM for the MNA is not yet defined by a standards body. For MNA, there is a need to not only verify the reachability of an operational function found or identified in a packet header but also to verify the MNA hardware capability before enabling the MNA application on data traffic to avoid traffic disruption. There is an interest in collecting performance data from the network for network-wide analytics to enable artificial intelligence and machine learning to improve the network efficiency and prevent network service degradation and outages and for predictive networking. Monitoring performance and OAM of data traffic flow using OAM probe messages is referred to as active measurement. For example, if an MNA application is going to be provisioned, the approach disclosed herein will enable an OAM probe packet to be transmitted which can determine on a node-by-node basis in a network whether respective nodes can perform or "reach" an operational function associated with that application. If a node cannot perform the MNA feature, then a new path can be determined for the application to avoid traffic disruption.

The novel MNA solution defined is legacy network friendly and can be easily deployed incrementally without upgrading the entire network. The does not adversely affect the hardware performance and can be implemented in hardware application specific integrated circuits (ASICs) at line-rate. The encapsulating headend nodes can ensure that the MNA sub-stack is not received at the top of the MPLS label stack at the node to avoid the packet dropped at the node that does not support MNA.

In a first embodiment, the techniques described herein relate to a method of validating a hardware path capability, the method including: generating, at an ingress (headend, source or encapsulating) node of a network, an operations, administration and maintenance (OAM) probe packet having an OAM bit set associated with validating the hardware path capability, wherein the OAM probe packet includes a plurality of features; indicating, by each respective intermediate node of a plurality of intermediate nodes in the network along a network path and as instructed by the OAM bit set, whether the respective intermediate node can support the respective feature of the plurality of features; generating, at an egress (endpoint, tailend, or decapsulating node) node associated with the network path, a report regarding whether the plurality of intermediate nodes can support each respective feature of the plurality of features within the OAM probe packet; and determining, based on the report, whether to enable customer traffic implementing the plurality of features along the network path.

In some aspects, the techniques described herein relate to a system for validating a hardware path capability, the system having a plurality of intermediate nodes in a network, the system including: at least one processor; and a computer-readable storage medium storing instructions which, when executed by the at least one processor, cause the at least one processor to perform operations including: generating an operations, administration and maintenance (OAM) probe packet having an OAM bit set associated with validating a hardware path capability, wherein the OAM probe packet includes a plurality of features; indicating, by each respective intermediate node of the plurality of intermediate nodes in the network along a network path and as instructed by the OAM bit set, whether the respective intermediate node can support the respective feature of the plurality of features; generating a report regarding whether the plurality of intermediate nodes can support each respective feature of the plurality of features within the OAM probe packet; and determining, based on the report, whether to enable customer traffic implementing the plurality of features along the network path.

In some aspects of the first embodiment, the techniques described herein relate to a which, when executed by at least one processor, cause the at least one processor to perform operations including: generating an operations, administration and maintenance (OAM) probe packet having an OAM bit set associated with validating a hardware path capability, wherein the OAM probe packet includes a plurality of features; indicating, by each respective intermediate node of a plurality of intermediate nodes in a network along a network path and as instructed by the OAM bit set, whether the respective intermediate node can support the respective feature of the plurality of features; generating a report regarding whether the plurality of intermediate nodes can support each respective feature of the plurality of features within the OAM probe packet; and determining, based on the report, whether to enable customer traffic implementing the plurality of features along the network path. Intermediate node can be the MPLS header decapsulating node or segment routing segment endpoint node.

In a second embodiment, the techniques described herein relate to a method of finding a path maximum readable segment identifier depth as hardware memory often have limited capability to be able to read or write data deep into the packet, the method including: identifying a set of nodes between a headend node (ingress node or encapsulating node or source node) and an endpoint node (egress node or decapsulating node) using probe in a multiprotocol label switching network actions (MNA) framework; allocating, in a packet, a "validate label processing opcode" including a validation code in an ancillary data field that is used to validate label processing; recording, at each node of the set of nodes, a respective last read validation code in the data field of the validate label processing opcode; and reporting, by each node of the set of nodes, the respective last read validation code for the packet; to the headend node. In some aspects, the techniques described herein relate to a system for validating a hardware path capability, the system having a plurality of intermediate nodes in a network, the system including: at least one processor; and a computer-readable storage medium storing instructions which, when executed by the at least one processor, cause the at least one processor to perform operations including: identifying a set of nodes between a headend node and an endpoint node using probe in a multiprotocol label switching network actions (MNA) framework; allocating, in a packet, a validate label processing opcode including a validation code in a data field that is used to validate label processing; recording, at each node of the set of nodes, a respective last read validation code in the data field of the validate label processing opcode; and reporting, by each node of the set of nodes, the respective last read validation code for the packet; to the headend node.

In some aspects of the second embodiment, the techniques described herein relate to a which, when executed by at least one processor, cause the at least one processor to perform operations including: identifying a set of nodes between a headend node and an endpoint node using probe in a multiprotocol label switching network actions (MNA) framework; allocating, in a packet, a validate label processing opcode including a validation code in a data field that is used to validate label processing; recording, at each node of the set of nodes, a respective last read validation code in the data field of the validate label processing opcode; and reporting, by each node of the set of nodes, the respective last read validation code for the packet; to the headend node.

DETAILED DESCRIPTION

As noted above, the proposed solution described herein avoids traffic disruption and enables the ability of the system to discover and verify hardware capability before starting MPLS network actions (MNA) applications and the associated application traffic flow. The Internet Engineering Task Force (IETF) is working to standardize the MNA requirements, framework and solution. In the current IETF MPLS design, there is the potential for adding an MPLS network action sub-stack header support to the new MPLS infrastructure. Using this sub-stack header, some additional information apart from an MPLS label can be encoded in the MPLS label stack. Applications like deterministic networking (DETNET), Time-sensitive networks (TSN) (using deadline time for delay-bound applications, etc.), 5G network slicing (using slice-ID, IETF Network Resource Partition ID (NRD-ID) etc.), IOAM (using timestamp, interface queue, etc.), path tracing (PT), ECMP load-balancing (using Entropy, etc.), Alternate Marking Method, Direct Export (DEX), and other internet functions can use this infrastructure. The approach disclosed herein proposes changes to the MPLS stack which discovers and verifies hardware capability on a node-by-node basis from an ingress or headend node to an egress node of a network. There are several different embodiments disclosed for how to achieve the discovery process.

Implementing MPLS extension header and applications in an MNA context requires additional hardware capabilities. There would be different types of hardware that exist in a network, each hardware has its own level of capability to support the MPLS network actions sub-stack and applications. Since this is a new infrastructure being introduced in the MPLS network, the operators would require a sophisticated debugging mechanism to validate the hardware capabilities of the nodes in the network before using these infrastructures for new applications (such as IOAM, network slicing, time sensitive networking (delay-bound applications and DETNET), performance measurement, path tracing, etc.).

The MNA hardware capability for each MNA operational code (opcode) can be flooded via IGP (interior gateway protocol) and BGP-LS (border gateway protocol-link state) in the network, however, it does not scale well given the number of MNA action opcodes. For example, there can be over one hundred possible opcodes and more can be developed. MNA action flags are provided for opcodes. There is also a varying degree of associated in-stack and post-stack network action data that can be used for respective opcode functions. Even after discovering the MNA capabilities of a respective node based on routing protocols, there is still a need to run OAM probes and verify the given MNA application on a specific path before enabling the MNA application on a customer data traffic to avoid any traffic disruption and black holing. By combining MNA OAM probes for discovering and validating the MNA opcode capability using one round-trip probe message before enabling the MNA application on a customer data traffic is highly desired to provide guaranteed services as it is scalable, simple, and optimized.

The control plane protocol such as PCEP (path computation engine protocol) could exchange or share the capability of a given node, but that data still needs to be validated to ensure a service level agreement (SLA) as different line cards and different ASICs may have varying degree of MNA capabilities along the equal-cost multi-path paths. This disclosure addresses these issues as well.

This disclosure introduces an encoding of the MPLS label stack and a basic structure used to define a forwarding path. Forthcoming applications require MPLS packets to perform special network actions and carry optional ancillary data (AD) that can affect the packet forwarding decision or trigger OAM logging, for example. Ancillary data can be used to carry additional information, such as a network slice identifier (also known as an IETF network resource partition identifier) or an entropy value for load balancing or deadline time for DETNET, alternate marking bits for direct export, timestamp for delay measurement, etc. User-defined network actions allow new, local actions to be defined.

This disclosure defines the syntax and semantics of network actions encoded within an MPLS label stack. Network actions can be encoded with or without AD, either in (in-stack) or after the label stack (post-stack). In-stack actions and ancillary data are contained in a network action sub-stack (NAS), which is recognized by a new base special purpose label (bSPL) to be allocated by IETF standard.

FIG. 1 illustrates an ingress-to-egress, hop-by-hop, select (IHS) table 102 in accordance with an aspect of this disclosure. The IHS refers to the scope of the NAS and can dictate where this NAS should be processed. The table 102 includes a column related to bits and a column related to the scope or operation associated with each combination of two bits. The scope relates to the select node processing scope. A network action substack can relate to an operational code or opcode that is included in a header that is a feature or process that may or may not be capable of being achieved or required or performed by a given node. For example, a value of 00 can have a scope of I2E which means "ingress-to-egress scope" which indicates that the processing of the network action should occur only on the egress node or decapsulating node. A value of 01 is HBH in scope which means on a hop-by-hop scope and processing of the network action should occur on all intermediate nodes. The bit value of 10 can have a scope of select in which only specific nodes along the path will perform the action. FIG. 1 illustrates an example table of how to instruct respective nodes along a path to treat a particular packet. The bit value of 11 can refer to a reserved set of bits for other functions or can be used for example for "Do-Not-Process" or "Skip-Processing" as example optional processes.

Figure 2:
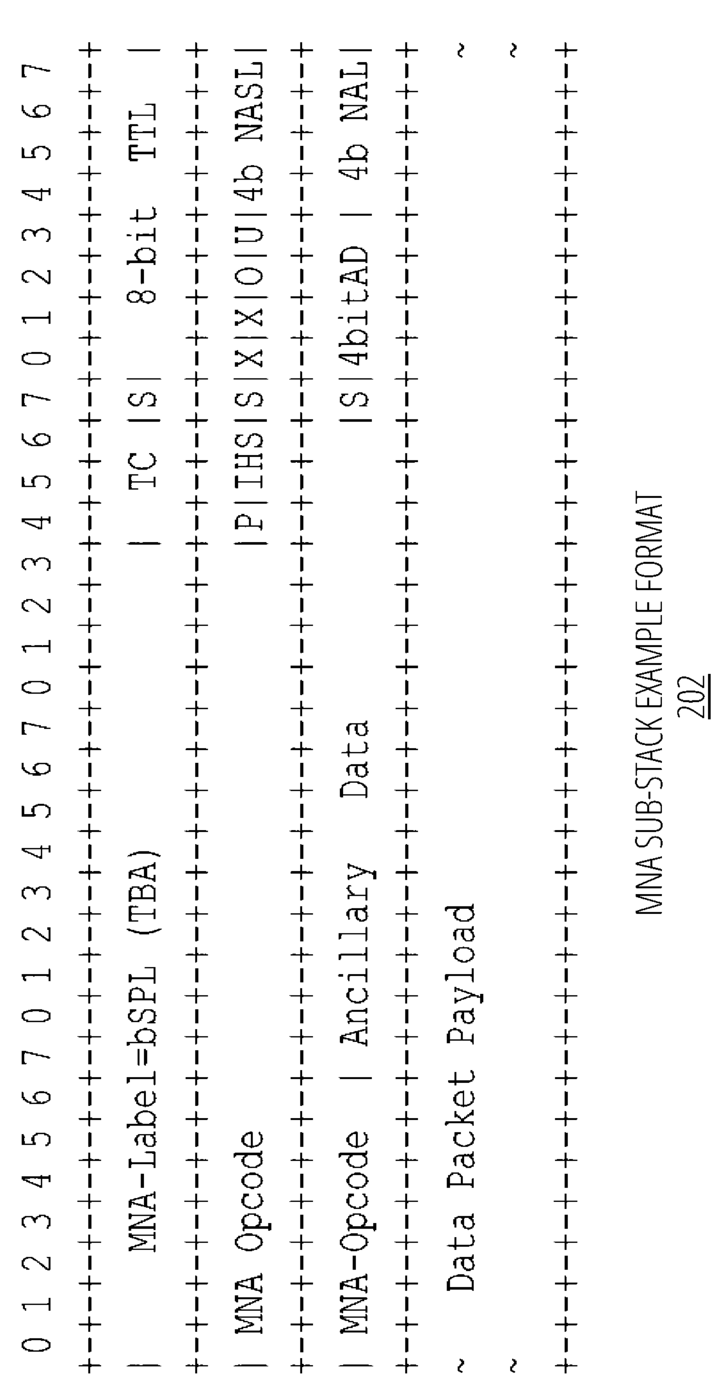
FIG. 2 illustrates an MNA sub-stack with flag-based network action indictor with no data in accordance with an aspect of this disclosure.

FIG. 2 illustrates an example MNA sub-stack example format 202 which includes fields for MNA opcodes, ancillary data and a region for a data packet payload. This disclosure will provide for various structures of the header or sub-stack format 202 that include the use of codes and data to detect the capabilities of individual nodes.

Figure 3:
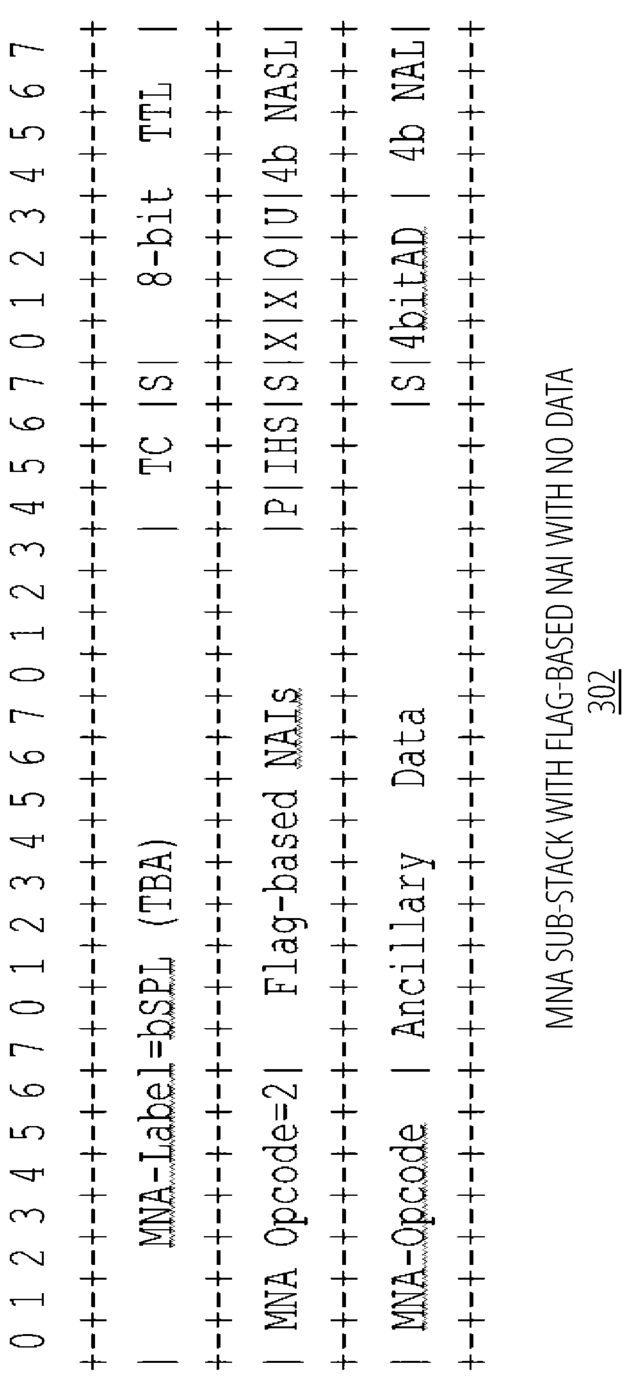
FIG. 3 illustrates an MNA sub-stack with flag-based network action indictor with no data in accordance with an aspect of this disclosure.

FIG. 3 illustrates an MNA sub-stack with flag-based network action indicator (NAI) MNA sub-stack with no data 302. The MNA sub-stack with flag-based NAI with no data 302 includes a field including "Opcode=2" to indicate a particular process that an application will implement.

Figure 4:
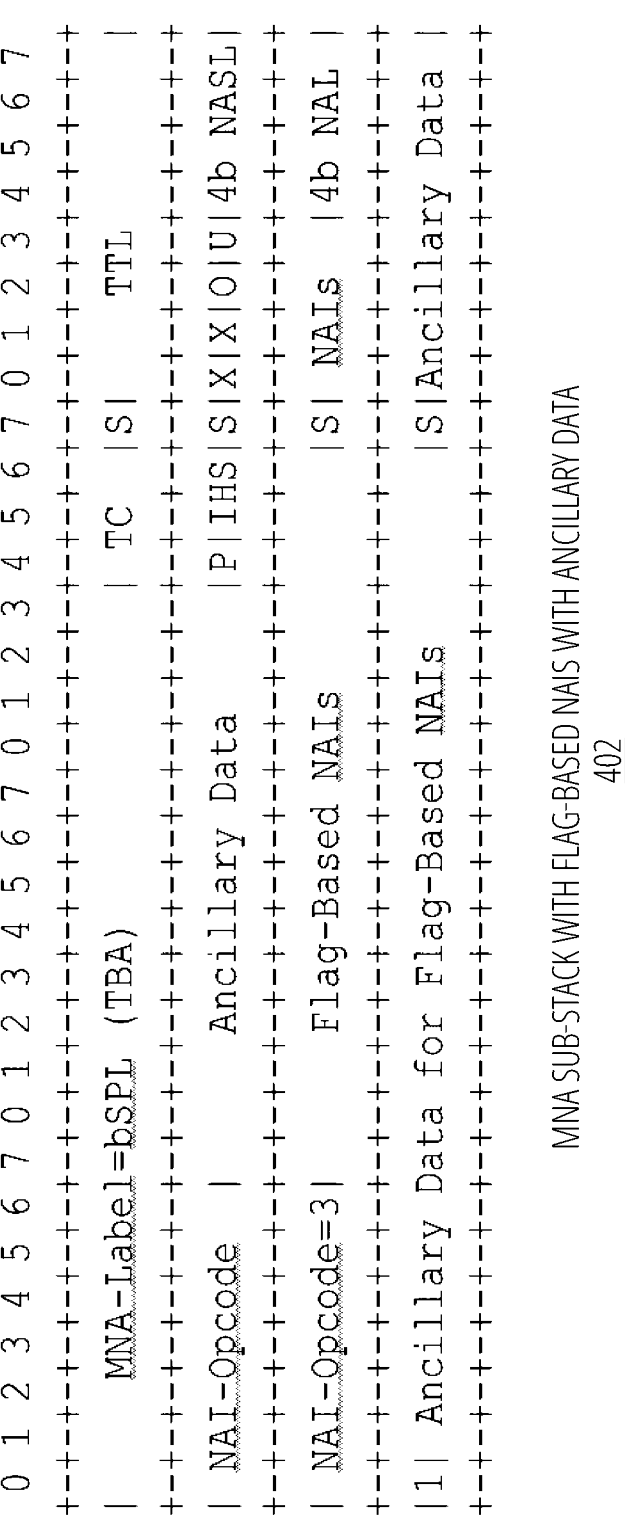
FIG. 4 illustrates an MNA sub-stack with flag-based network action indicators with ancillary data in accordance with an aspect of this disclosure.

FIG. 4 illustrates an MNA sub-stack with flag-based NAIs with ancillary data 402. Note that there is listed ancillary data for the flag-based NAIs and an NAI-Opcode=3.

Figure 5:
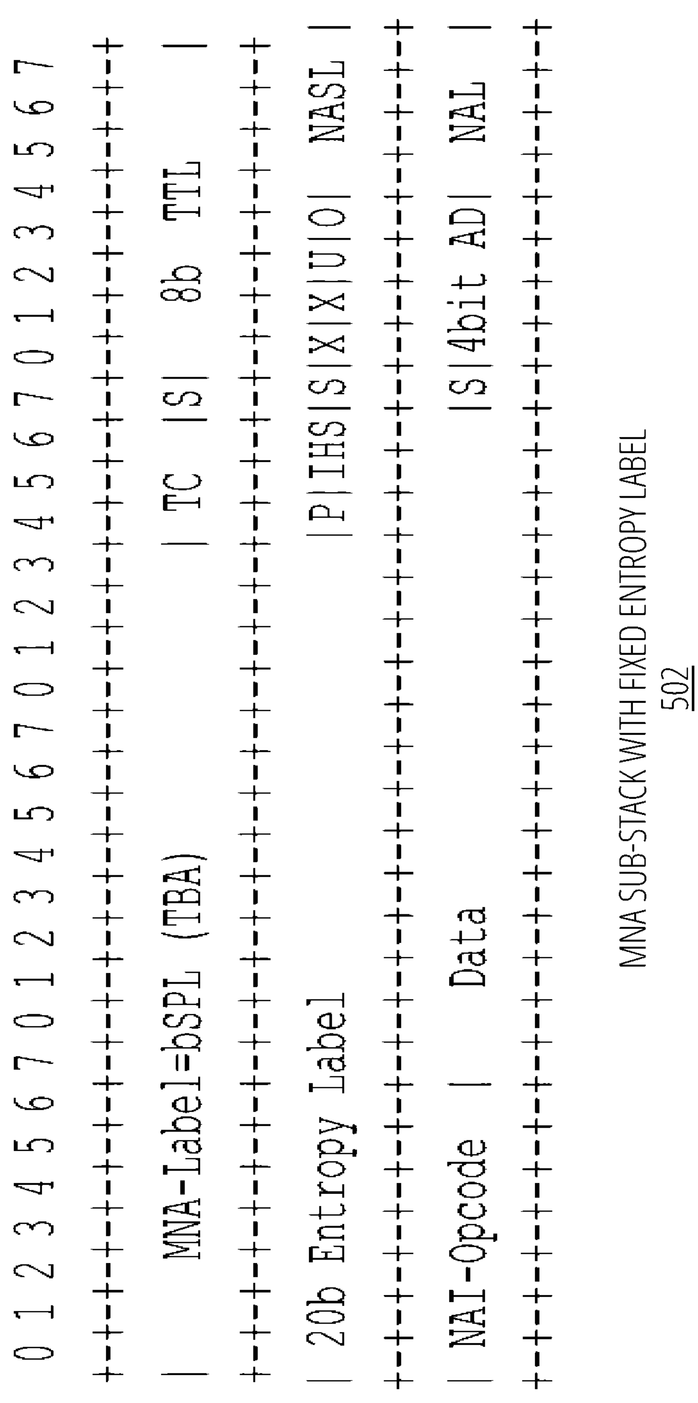
FIG. 5 illustrates an MNA sub-stack with a fixed entropy label and a second LSE in accordance with an aspect of this disclosure.

FIG. 5 illustrates an MNA sub-stack with fixed entropy label 502. Note the fixed entropy label is configured in the second label stack entry.

Figure 6:
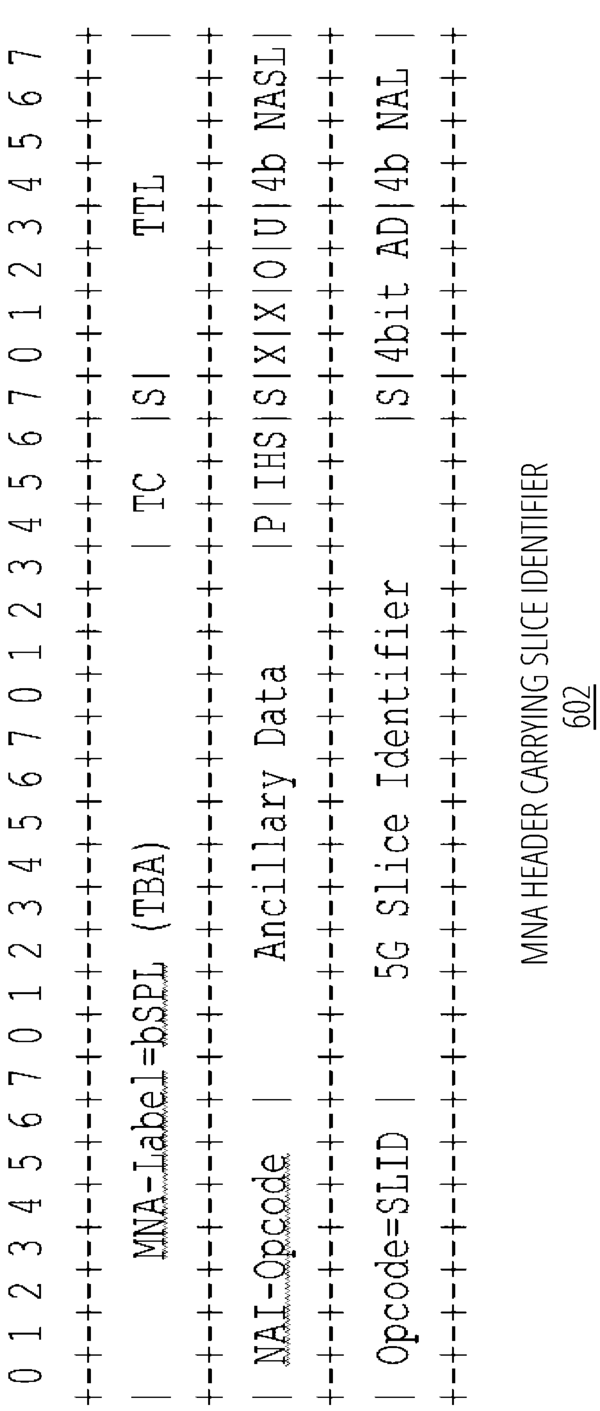
FIG. 6 illustrates an example MNA header carrying a slice identifier in accordance with an aspect of this disclosure.

FIG. 6 illustrates an MNA header carrying slice identifier (e.g., a network resource partition (NRP) identifier or NRPID) 602. A 5G slice identifier (NRP identifier) 602 with an Opcode=SLID (slice ID) or NRPID are shown as part of this structure.

Figure 7:
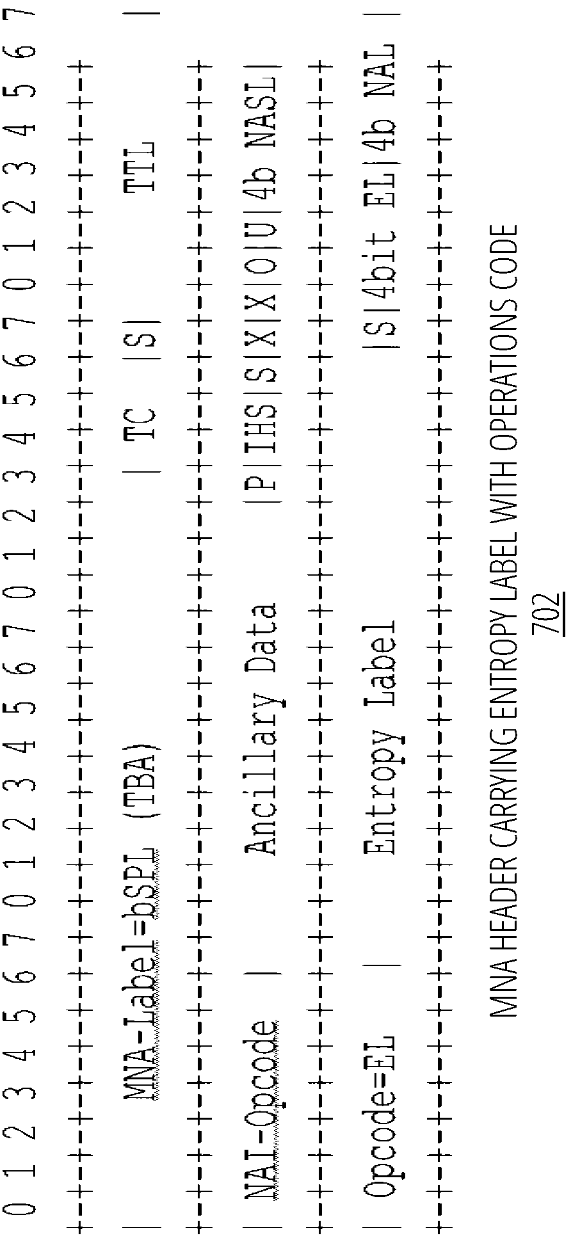
FIG. 7 illustrates an example MNA header carrying an entropy label with an operation code in accordance with an aspect of this disclosure.

FIG. 7 illustrates an MNA header carrying an entropy label with operations code 702. The Opcode=EL for "entropy label".

The current basic MNA solution describes the way to encode the MPLS extension header and its required encoding/control bits. Various opcodes for applications can be carried for specific use-cases including slice-id (NRPID), IOAM, entropy, telemetry trigger and marking, performance delay/loss measurement, etc. However, what is disclosed herein is to use some of the NAS Parameters' control bits for OAM purposes and to provide a different behavior to process the OAM probe packets in hardware. This behavior enables the system to identify and validate the MNA hardware capabilities.

The figures below show the MPLS Packet with the MNA header. The two bits from the NAS encoding parameters are used to define different OAM behavior that is used while forwarding the packet. Other numbers of bits may be used as well. This OAM behavior can be used to discover and validate the MNA hardware capabilities of individual nodes in a network. When the MNA capable node receives the packet with MNA header then it must scan the MNA header in the packet and processes the network actions encoded in MNA and forwards the packet accordingly. Each respective node can also report back data to a headend node which can collect that data and determine whether the entire path is capable of handling application data according to an SLA even before the application starts.

The new forwarding behavior for MNA are introduced as follows which are encoded in the OAM flag: The value of 00 is a default value. This is the default behavior which is currently described in the IETF standards. A value of 01 is for "RUF" or read, update and forward. This functionality is to read the NAI-Opcode and if the hardware understands or can process the opcode, then the respective node increments the value present in the ancillary data of the header or packet and forwards the packet to the next node. This function also includes an instruction to not remove the MNA at the penultimate hop or the node previous to an egress node.

An OAM flag value of 10 (or some other value) can indicate RUCF or read, update, copy-to-CPU and forward. In this context, the "CPU" can refer to the control-plane running on a CPU or central processing unit. The node should read the NAI-Opcode and if the hardware understands then increment the value present in the ancillary data, send a copy of the updated packet to the CPU (punt copy) and forward the packet downstream. In other words, after processing the OAM probe packet in forwarding (in data-plane), a copy of the packet is sent (punted) to the control-plane (running on the CPU) for further processing and the original packet is forwarded to the next-hop (downstream) router. The flag also means do not remove the MNA at the penultimate hop. In one example, an EXP-NULL label can be added to ensure this. The value of 11 is reserved for future use or can be used for "Do-Not-Process" or "Skip-Processing" features. These are example values for the OAM flag. Other instructions or functions can also be provided to be performed by each node.

Information collected in the data field of the MNA is used to decide where (which node) the given MNA opcode (application) is supported by the hardware on the path of the packet. The information can be sent via telemetry to a headend node or to a controller from midpoint nodes or from the tail-end node or from the headend node. The network controller enables the given application on data traffic when nodes along the packet path support the application in hardware. The following figures of sub-stacks illustrate the use of the OAM flag. One aspect involves using a network controller. In many customer deployments, the label stack for segment routing is computed by the controller or a segment routing path computation element (SR-PCE). The maximum segment identifier (SID) read (and write) depth (MSD) information collected is used with the controller to be able to optimize the segment list of MPLS labels and place the entropy and other MNA actions at the appropriate depth in the label stack. The information can be sent via telemetry from midpoint nodes and headend nodes, or from the endpoint or egress node directly.

As noted above, there are OAM (operations, administration, maintenance) tools like MPLS ping/traceroute/tree-traces which are control plane based and only discover the reachability and verify the forwarding paths. However, today, none of these OAM tools provide an ability to discover and verify the hardware capability. Furthermore, the MNA concept is a new infrastructure and the OAM for the MNA is not defined. For MNA, there is a need to not only verify the reachability but also to verify the MNA hardware capability before enabling the MNA application on data traffic to avoid traffic disruption. This is what the present disclosure introduces to the MNA sub-stack. Some of concepts associated with the MNA sub-stack are introduced followed by a discussion of the use of OAM data within the MNA sub-stack.

Figure 8:
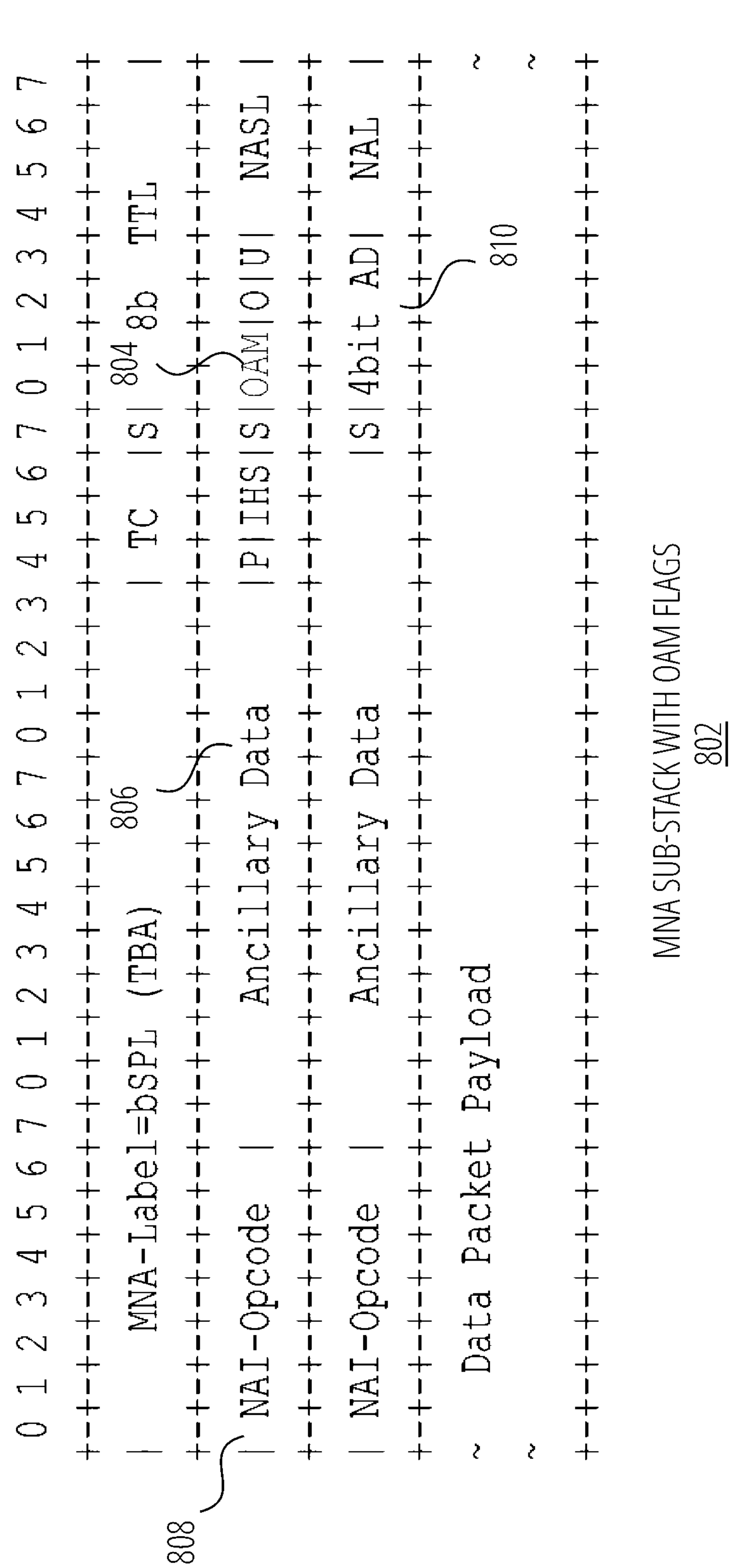
FIG. 8 illustrates an example MNA sub-stack with OAM flags in accordance with an aspect of this disclosure.

FIG. 8 illustrates an MNA sub-stack with OAM flags 802. The OAM flag 804 is introduced to use some of the network action sub-stack (NAS) parameter control bits for OAM purposes and to provide a different behavior to process the OAM probe packets in hardware. This behavior enables the system to identify and validate the MNA hardware capabilities. As noted above, when the value of the OAM flag is 01 (by way of example), the node that receives the packet/header will read, update and forward the packet. This functionality is to read the NAI-opcode and if the hardware understands or can process the opcode 808, then the node increments the value present in the ancillary data 806 or 810 and forwards the packet. This function also includes an instruction to not remove the MNA at the penultimate node.

An OAM flag value of 10 means RUCF or read, update, copy-to-CPU and forward. This means that the node should read the NAI-opcode 808 and if the hardware (respective node) understands then increment the value present in the ancillary data 806, 810, sends a copy of the updated entire packet or packet headers to the CPU and forward the packet downstream.

Figure 9:
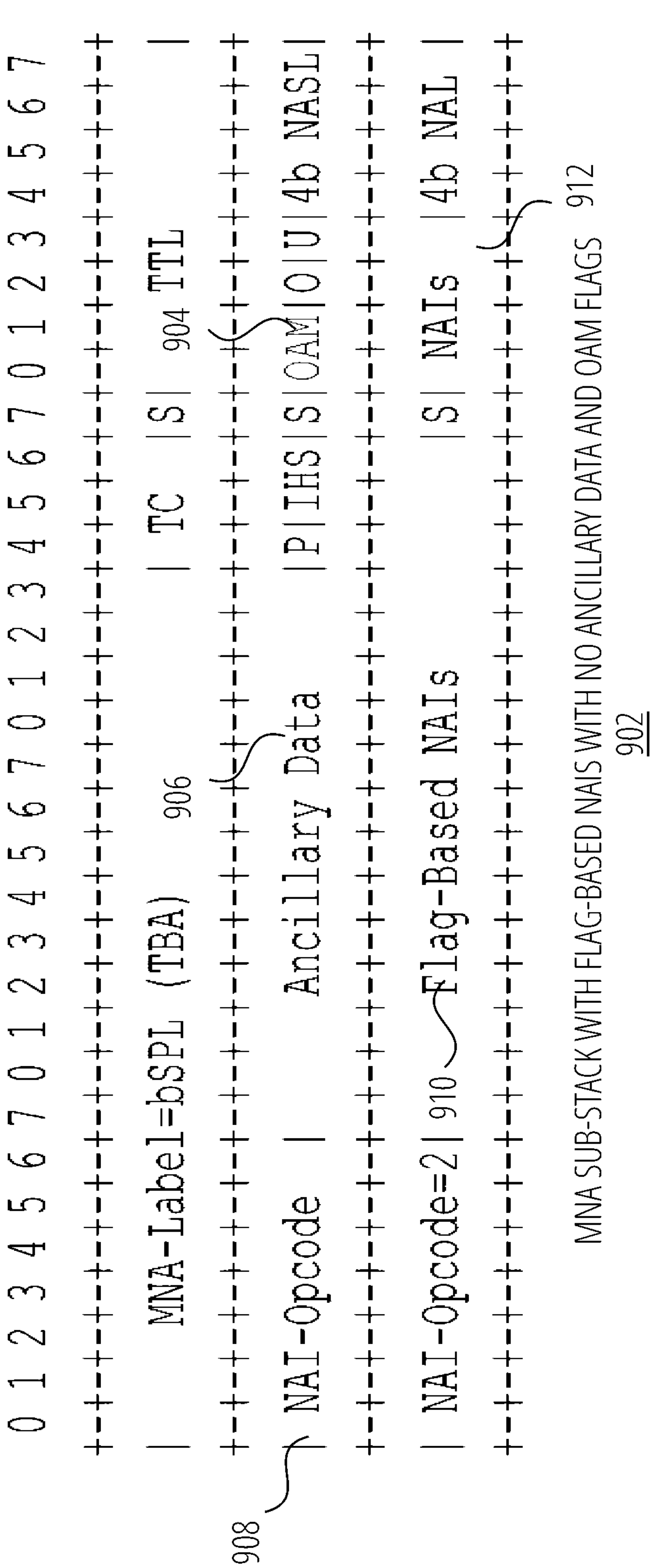
FIG. 9 illustrates an MNA sub-stack with flag-based NAIs with no ancillary data and OAM flags in accordance with an aspect of this disclosure.

FIG. 9 illustrates an MNA sub-stack with flag-based NAIs with no ancillary data and OAM flags 902. The OAM flag 904, ancillary data 906, NAI-opcode 908, flag-based NAIs 910 and NAIs 912 are all shown in the sub-stack.

Figure 10:
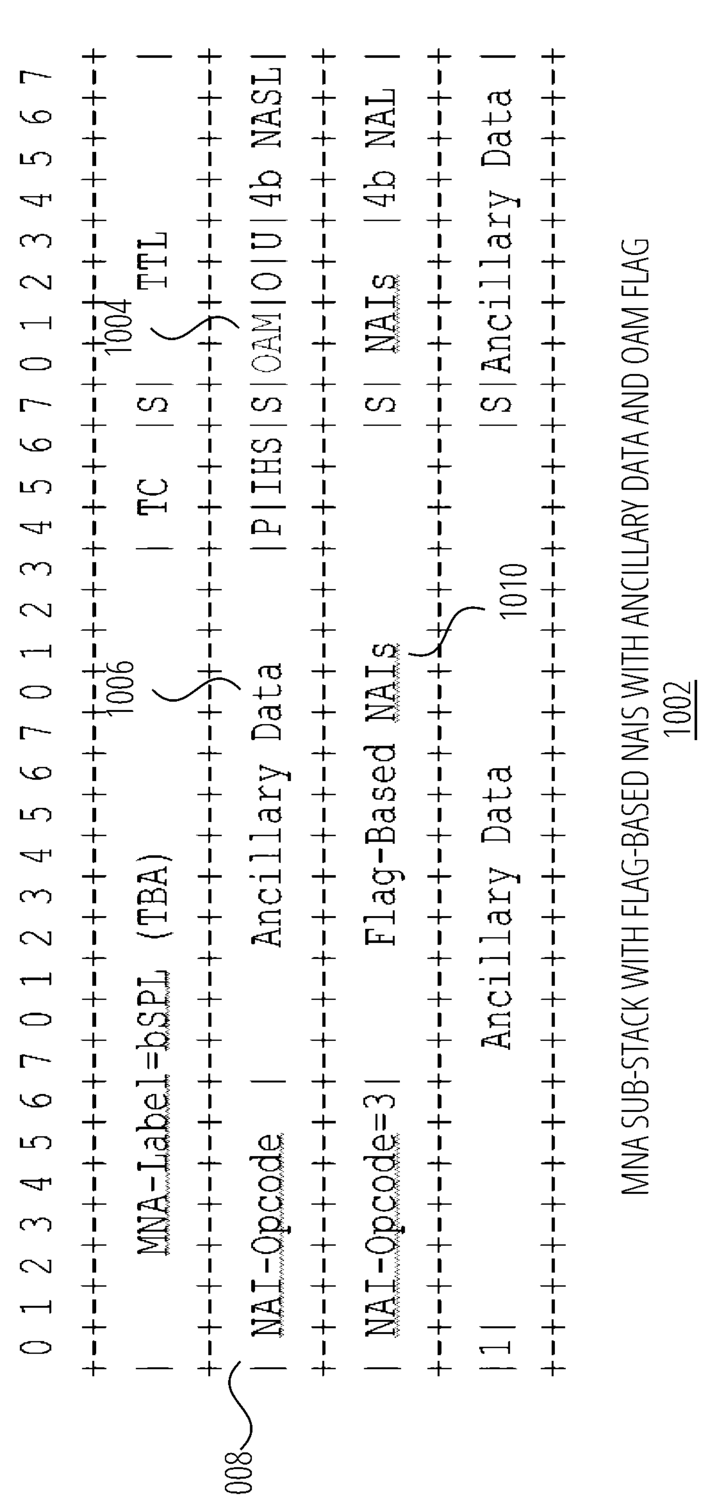
FIG. 10 illustrates an MNA sub-stack with flag-based NAIs with ancillary data and an OAM flag in accordance with an aspect of this disclosure.

FIG. 10 illustrates an MNA sub-stack with flag-based NAIs with ancillary data and OAM flag 1002. The OAM flag 1004 indicates how a respective node should process the packet. The ancillary data 1006, NAI-opcode 1008 and flag-based NAIs 1010 are all shown.

Figure 11:
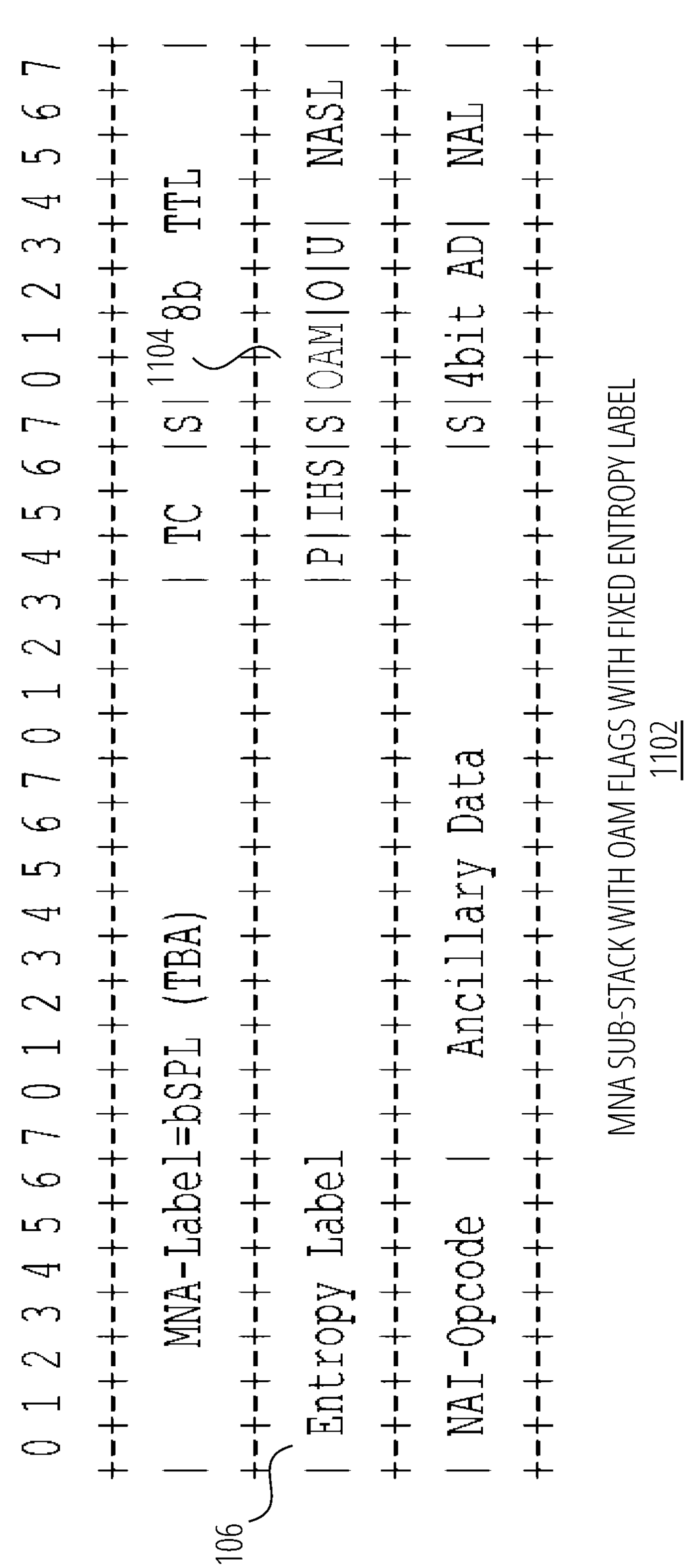
FIG. 11 illustrates an MNA sub-stack with OAM flags with a fixed entropy label in accordance with an aspect of this disclosure.

FIG. 11 illustrates an MNA sub-stack with OAM flags with fixed entropy label 1102. In this case, there is an OAM flag 1104 and an entropy label 1106.

Figure 12:
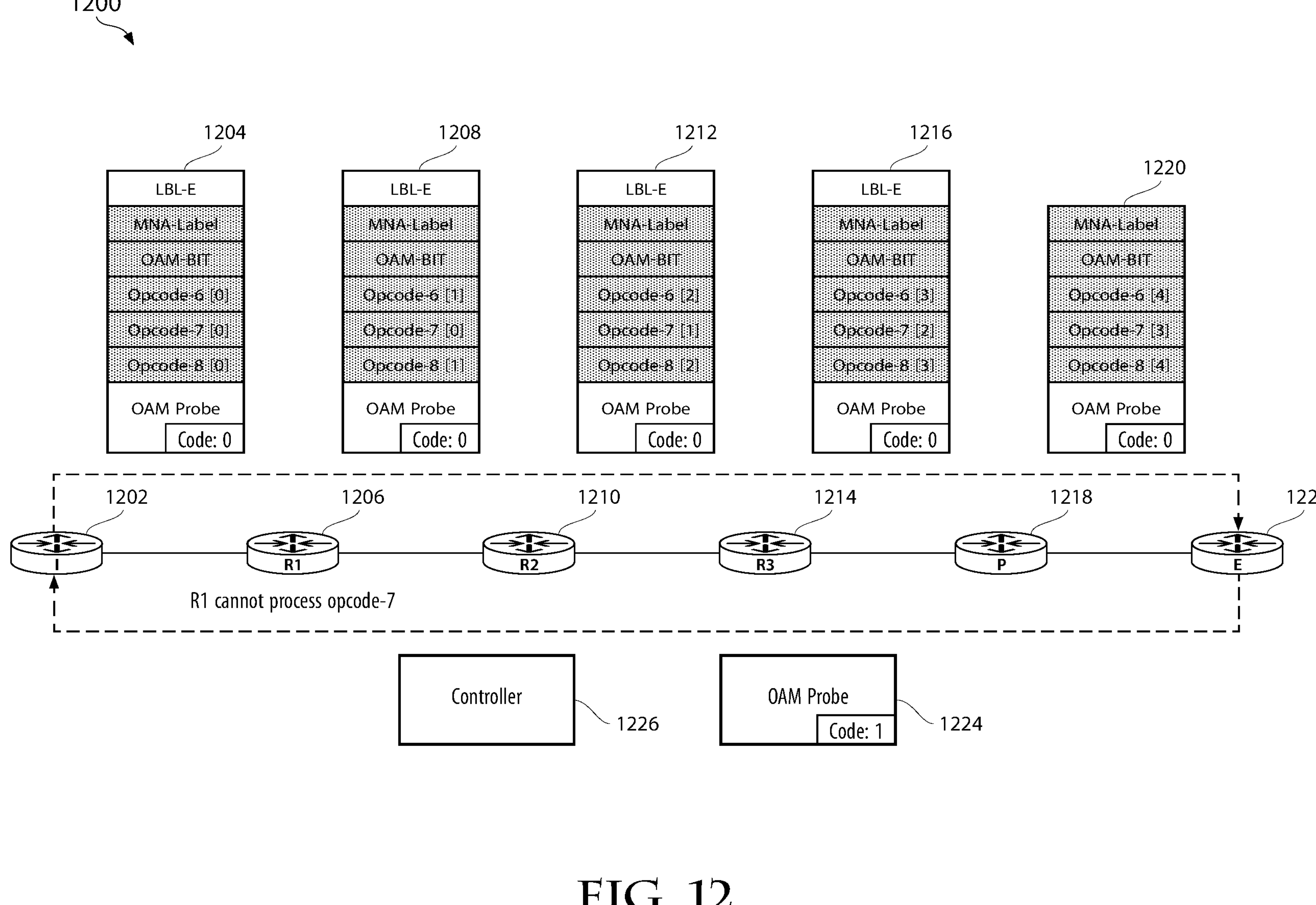
FIG. 12 illustrates a packet traversing multiple MNA nodes in accordance with an aspect of this disclosure.

FIG. 12 illustrates an example of a packet or OAM probe 1224 traversing a group of MNA nodes 1200. This figure illustrates the procedures to validate a hardware path capability using OAM probes.

As part of MNA, multiple applications could allocate a new opcode for their own purposes. All the nodes in the network may not support all the MNA opcodes, so when the headend node 1202 encodes the opcodes, then it must know whether the MNA opcode that is encoded in the packet must be supported by the nodes though which its traffic is flowing through.

In the above case "I" is the ingress node (or headend node) 1202 and "E" is the egress node 1222. In one example, the ingress node 1202 intends to encode the MNA opcode "6", "7" and "8", but it has to validate whether the intermediate nodes 1206, 1210, 1214, 1218 support all the opcode. As the OAM probe 1224 traverses across the nodes 1206, 1210, 1214, 1218, each node that supports the respective opcode will increment a counter in an AD field (sec, e.g., fields 806, 810 in FIG. 8) which is then used to compare with TTL to detect on the egress node 1222 if any given respective node did not support a given opcode.

The following are example processes as part of the use of the OAM flag. Some operations first that can be performed by the headend node 1202 can include one or more of the node 1202 crafting an OAM probe packet with the LBL-E (The MPLS Label to reach the Node-E or the egress node 1222), LBL-I (The MPLS Label to reach back to the Node-I), MNA Label with OAM BIT "01" is set, encode opcode-6, 7, 8 with the ancillary data value as "0" and forward the packet towards Node-E 1222. The opcodes 6, 7, 8 are described just by way of example as a selection or set of functions chosen from a larger set of possible functions. The TTL (time to live) value of all the valid MPLS (including MNA Label) is 255. The node 1202 also can initialize OAM diagnostic code to none.

Then each respective intermediate node 1206, 1210, 1214 can perform operations including decrementing the LBL-I TTL value, reading the opcode 6, 7, 8 and increment the corresponding ancillary data and forward the packet to the next node. The penultimate node 1218 and egress node 1222. These can also be called the forward path node-P (penultimate hop 1218 for node-E 1222. The penultimate node 1218 can decrement the LBL-I TTL value, pop the LBL-E MPLS Label, copy the TTL value from LBL-E to LBL-I, read the opcode 6, 7, 8 and increment the corresponding ancillary data and forward the packet. The penultimate node 1218 can pop the label and find the MNA at the top of the stack, process the MNA and also remove the MNA stack. In order for the MNA stack to reach the tail-end node (egress node 1222), a service label (VPN label) or explicit-NULL label can be used with the MNA stack such that it reaches the tail-end node 1222.

The egress node 1222 can decrement LBL-I TTL value, check the Diff-TTL=(255–MNA-TTL-value), read the opcode 6, 7, 8 and verify whether the Diff-TTL is matching with the ancillary data in all MNA opcodes. If not, then set a code (such as a diagnostic code) to error.

There is a return path shown to the headend node 1202 from the egress node 1222. If the code is error, then the egress node 1222 declares the failure and takes necessary action. The above description is a one-way testing of the hardware capability of the path through the network.

When the message is transmitted from the egress node 1222 to the headend node 1202, a UAH (unknown application handling) field in the MNA header of the packet must be set to skip the opcode and must not be set to drop the packet to be able to forward the packet back to the headend node 1202.

Part of the disclosure can include extending IHS scope shown in FIG. 1 to a value that indicates: "Do not Process MNA stack". In case of one-way monitoring, the collected MNA information in the forward direction needs to be propagated back to the headend node 1202. The intermediate nodes need to avoid processing the MNA stack on the return path. In this case, new IHS scope is defined to not process the MNA stack as value binary 111. This scope is ignored by the midpoint nodes 1206, 1210, 1214 and egress (in the reverse direction) nodes and is not processed and MNA stack is removed when the MPLS encap is removed. When the packet is punted to the control-plane, it is always punted with the MNA stack and the MPLS header with the collected MNA data.

There is an alternate approach using a counter that can be used. In a variant, a node that does not recognize the opcode can increment a counter in the AD field of the opcode that can be then used if non-zero value by the egress node 1222 to detect if any node did not support the given opcode.

A two-way option can also be implemented in which two-way hardware capability testing could be done. Two-way probes could be run continuously with the above encapsulation to verify whether the opcode functions are executed on their path. If there is a failure, then path could be declared as down. In the above example Node-R1 1206 does not support opcode-7, so it will not increment the counter for opcode-7, so the Diff-TTL value will not match the opcode-7. By doing this, the headend node 1202 can detect that one of the nodes in their path does not support opcode-7.

In one example, in the case of segment-routing, if the headend node 1202 adds the network slice-ID, e.g., a NRP ID) as part of the MNA opcode, then this mechanism makes sure that the slice ID (NRP ID) MNA opcode could be read and processed by all the mid-nodes 1206, 1210, 1214. Before enabling the slice-ID (NRP ID) for customer data traffic, the probe 1224 can ensure the path supports slice-ID (NRP ID) and required SLA can be met for the slice and customer traffic using that slice (network resource partition).

In another example, proposals for an industry standard (Request for Comment (RFC) 9197 and RFC 9326) define various trace-options for In-situ OAM (IOAM) including timestamps and interface IDs. In-situ OAM provides real-time telemetry of individual data packets and flows. It is based on telemetry information which is embedded within live user traffic. In this context, 'live user traffic' refers to packets originated and terminated at the application layer. Proposed MNA mechanisms can be used to discover the hardware capability along the packet for IOAM trace-option support and which nodes support which trace options. This information is recorded in the data part of the new MNA opcode sent in the probe packets. The discovered IOAM trace-option capability is then used to enable certain IOAM trace for a data flow.

Note that various RFCs from the Internet Engineering Task Force (IETF) are mentioned herein. Each of these RFCs can be found at https://www.ietf.org/standards/rfcs/. Each one that is mentioned is incorporated herein by reference in its entirety.

The following describes how to detect capabilities of a specific node in a path as shown in FIG. 12. The above approach cannot be used to detect the capabilities for a specific node. To find the un-capable node in the path, the headend node 1202 has to craft a packet towards the egress node 1222 (Node-E) with MNA OAM bits set to "10" and increment the TTL (from 1 to Max-Hops, like trace-route) step-by-step to find the return value of MNA opcodes Ancillary Data value of each node. This will help the headend node 1202 to find which node is not incrementing the ancillary data of a specific MNA opcode.

Alternatively, the node that does not support the opcode in the MNA header of an OAM probe packet as identified in the OAM field, will not forward the packet downstream (as defined by UAH—Unknown Application Handling to drop the packet and not set to skip the opcode) and punt the packet locally to the control plane CPU for telemetry or sends a probe message reply back (or Internet control message protocol (ICMP) packet) to the headend node 1202 that can locate the node easily from the reply message. This approach is described in more detail below in FIGS. 18-20.

There also can be variants using bitmap. Proposed scheme can be defined using a bitmap instead of using a counter. When using a bit-map, the node that supports the opcode sets a least-significant bit (LSB) bit in the AD part and shifts the AD left by 1 bit. This way based on the number of bits set and not set, the hardware capabilities can be discovered. In addition, based on the location of the bit set and not set, exact location of the node on the path of the packet can be detected that supports or non-support the hardware capability of the opcode. In this case, opcode with a 31-bit AD can be used to capture up to 31-bit hops data. The AD is initialized to 0 by the headend node.

In one aspect, an approach can be implemented using a controller 1226. The controller 1226 shown in FIG. 12 may generate the probe 1224 with MNA header to discover and validate the MNA application before enabling it on customer data traffic. The controller 1226 may consume the collected MNA opcode capabilities to find a specific path that can meet specific MNA use-case requirements. MNA capability collected is streamed via telemetry by the router either from the headend node 1202 or from the tail-end or egress node 1222 or from all midpoints to the controller 1226.

Next is discussed the idea of discovering and validating hardware capabilities of equal cost multi-paths (ECMPs). There may be several ECMP paths between two nodes, connected via different line cards that may have different hardware capabilities. To discover and validate the hardware capabilities of all ECMP paths that packet may traverse, new network action opcode "ECMP duplicate packet" with HBH scope is defined for MNA. When a node 1206, 1210, 1214 detects the opcode in MNA sub-stack, it copies the received packet and forwards it to all next-hop ECMP paths those are installed in forwarding, in addition to capturing the hardware capability information described above. This way a single probe message sent from the headend can collect all ECMP path hardware capabilities in a scalable manner. In addition, the node may also update the ancillary data field of the opcode in MNA with the number of ECMPs information. For example, it can multiply the current value in the Ancillary Data (AD) with the ECMPs. This way, headend can discover total ECMPs end-to-end along the packet path.

Another aspect of this disclosure includes the concept of selecting a node and an FEC (forwarding equivalence class) label. There are a number of approaches related to this general concept. First, instead of using a bSPL special purpose label, a new FEC label can be allocated and advertised by the node that supports and understands the MNA. The node can recognize its own FEC label and process the MNA sub-stack.

In another approach, an FEC label can be used to process the MNA on a select node. Instead of using regular forwarding/transport label, a new FEC label can be allocated and advertised by the node and added in the label stack. Only the node along the path that finds FEC label as a transport label will process the MNA sub-stack. Other nodes that see the regular transport label will skip the MNA sub-stack processing. An advantage of this method is that it takes one label less in MNA sub-stack.

Another approach is to use a global label (or a label like segment routing node segment ID as index in the label table) that can be allocated by the controller 1226 and programmed as network programming label that is used by the node 1210, 1214, 1218 to recognize the MNA sub-stack in the label stack and process the MNA sub-stack. An advantage of this method is it does not require signaling and flooding which is the case with FEC label.

Yet another approach includes using the ancillary data that may carry a context. For example, an indirect reference can be used for a locally provisioned network action. The network action can then be processed by the node in a way that understands the context by provisioning the context and may be flooding the network.

In general, this disclosure defines a novel OAM mechanism to discover and validate the different MNA hardware capabilities in ASIC and the stack machine modeled by Micro-CODE. The MNA header is extended to provide different OAM behaviors. The hardware capability of respective nodes 1210, 1214, 1218 can be discovered on per MNA opcode basis using probe messages 1224 and can be used to decide if specific paths (including all ECMPs) support the given application/use-case in hardware and can be enabled on data traffic carrying MNA after the discovery and validation. A controller 1226 can be used to generate the required OAM probe messages 1224 with MNA header to discover and validate the MNA hardware capability on respective nodes 1210, 1214, 1218 and to consume the collected MNA hardware capability from the nodes.

The concepts disclosed herein can be integrated with any existing OAM technologies (without modifying the probe protocol) and run from the individual nodes. The approach can be used to reroute traffic when the required MNA hardware capabilities on the path are not matching with the network intent.

FIG. 13 illustrates a method 1300 that relates to validating a hardware path capability in the context of a packet or a probe having a header configured according to the multi-protocol label switching network actions framework. The approach changes some of the current functionality of the header and thus how nodes in the network respond when processing a packet. The method 1300 can include generating, at an ingress node of a network, an operations, administration and maintenance (OAM) probe packet having an OAM bit set associated with validating the hardware path capability, wherein the OAM probe packet includes a plurality of features (1302); indicating, by each respective intermediate node of a plurality of intermediate nodes in the network along a network path and as instructed by the OAM bit set, whether the respective intermediate node can support the respective feature of the plurality of features (1304); generating, at a node associated with the network path (i.e., such as the egress node or another node), a report regarding whether the plurality of intermediate nodes can support each respective feature of the plurality of features within the OAM probe packet (1306); and determining, based on the report, whether to enable customer traffic implementing the plurality of features along the network path (1308). Each respective feature of the plurality of features can be indicated by a network action indicator operational code or opcode. The OAM bit set in one example can include two bits, although other sizes of the bit set are considered such as between one and three bits or more than three bits.

The OAM bit set determines forwarding behavior for the OAM probe packet 1224 by each node. In one aspect, the OAM bit set can include 00 as a default value, 01 is a read, update and forward value, and 10 is a read, update, copy to CPU and forward value. The OAM probe packet can be a multiprotocol label switching network actions packet with the OAM bit set. The method can further include when, based on the report, each of the plurality of intermediate nodes supports each of the plurality of features, enabling the customer traffic on the network path; and when, based on the report, at least one of the plurality of intermediate nodes does not support each of the plurality of features, not enabling the customer traffic on the network path. Furthermore, the method can include, when, based on the report, each of the plurality of the intermediate nodes supports a maximum readable segment depth (MRSD) of the plurality of features, enabling the customer traffic on the network path.

The step of indicating, by each respective intermediate node of the plurality of intermediate nodes in the network along the network path and as instructed by the OAM bit set, whether the respective intermediate node can support the respective feature of the plurality of features further can further include incrementing a counter (such as, for example, ancillary data in header of the packet) for each respective intermediate node that supports each respective feature of the plurality of features.

In one aspect, the determination of whether the respective intermediate node can support the respective feature of the plurality of features is stored in the OAM probe packet in an ancillary data field. The report can be generated at the egress node based on a time to live value in the OAM probe packet. Other nodes such as a penultimate node or a combination of nodes may also generate the report.

In another aspect, the method 1300 can further include one or more of: determining a feature capability of specific intermediate nodes of the plurality of intermediate nodes by setting the OAM bit set to 10; incrementing a time to live (TTL) value at each respective intermediate node of the plurality of intermediate nodes; receiving, at the ingress node and from each respective intermediate node based on the OAM bit set at a value, a respective return value of a multiprotocol label switching network action opcode ancillary value stored in the ancillary data field of the OAM probe packet; and determining, at the ingress node and based on the respective return value of a multiprotocol label switching network action opcode ancillary value, which respective intermediate node is not incrementing the multiprotocol label switching network action opcode ancillary value stored in the ancillary data field of the OAM probe packet for a specific feature of the plurality of features.

The OAM bit set can be in a header configured according to a multiprotocol label switching network actions framework as shown in FIGS. 8-11.

In another aspect, a method of validating a hardware path capability can include generating, at an ingress node of a network, an operations, administration and maintenance (OAM) probe packet having an OAM bit set associated with validating the hardware path capability, wherein the OAM probe packet comprises a plurality of features; indicating, by each respective intermediate node of a plurality of intermediate nodes in the network along a network path and as instructed by the OAM bit set, whether the respective intermediate node can support the respective feature of the plurality of features; generating, at an egress node associated with the network path, a report regarding whether the plurality of intermediate nodes can support each respective feature of the plurality of features within the OAM probe packet; determining, based on the report, whether to enable customer traffic implementing the plurality of features along the network path; and when, based on the report, each of the plurality of the intermediate nodes supports a maximum readable segment identifier (MRSID) depth or maximum readable segment depth (MRSD) of the plurality of features, enabling the customer traffic on the network path.

In another aspect, a method of validating a hardware path capability can include generating, at an ingress node of a network, an operations, administration and maintenance (OAM) probe packet having an OAM bit set associated with validating the hardware path capability, wherein the OAM probe packet comprises data associated with dropping or skipping the OAM probe packet by a node when the node does not support a feature of the OAM probe packet; and causing, by each respective intermediate node of a plurality of intermediate nodes in the network along a network path and as instructed by the OAM bit set, the respective intermediate node to: drop the OAM probe packet if the respective intermediate node does not support the feature of the OAM probe packet or skip the OAM probe packet and proceed to a next probe packet if the respective node does not support the feature of the OAM probe packet.

In yet another aspect, a method of validating a hardware path capability can include generating, at an ingress node of a network, an operations, administration and maintenance (OAM) probe packet having an OAM bit set associated with validating the hardware path capability, wherein the OAM probe packet comprises data associated with determining a scope of network access with respect to a maximum readable segment depth associated with the OAM probe packet by each respective intermediate node of a plurality of intermediate nodes in the network along a network path; identifying, by each respective intermediate node of the plurality of intermediate nodes in the network along the network path and as instructed by the OAM bit set, the respective intermediate node; and reporting, from one or more of nodes of the network path, to the ingress node regarding a respective scope of network access with respect to the maximum readable segment depth to determine whether the network path is usable for an application implementing features identified in the OAM probe packet.

Figure 14:
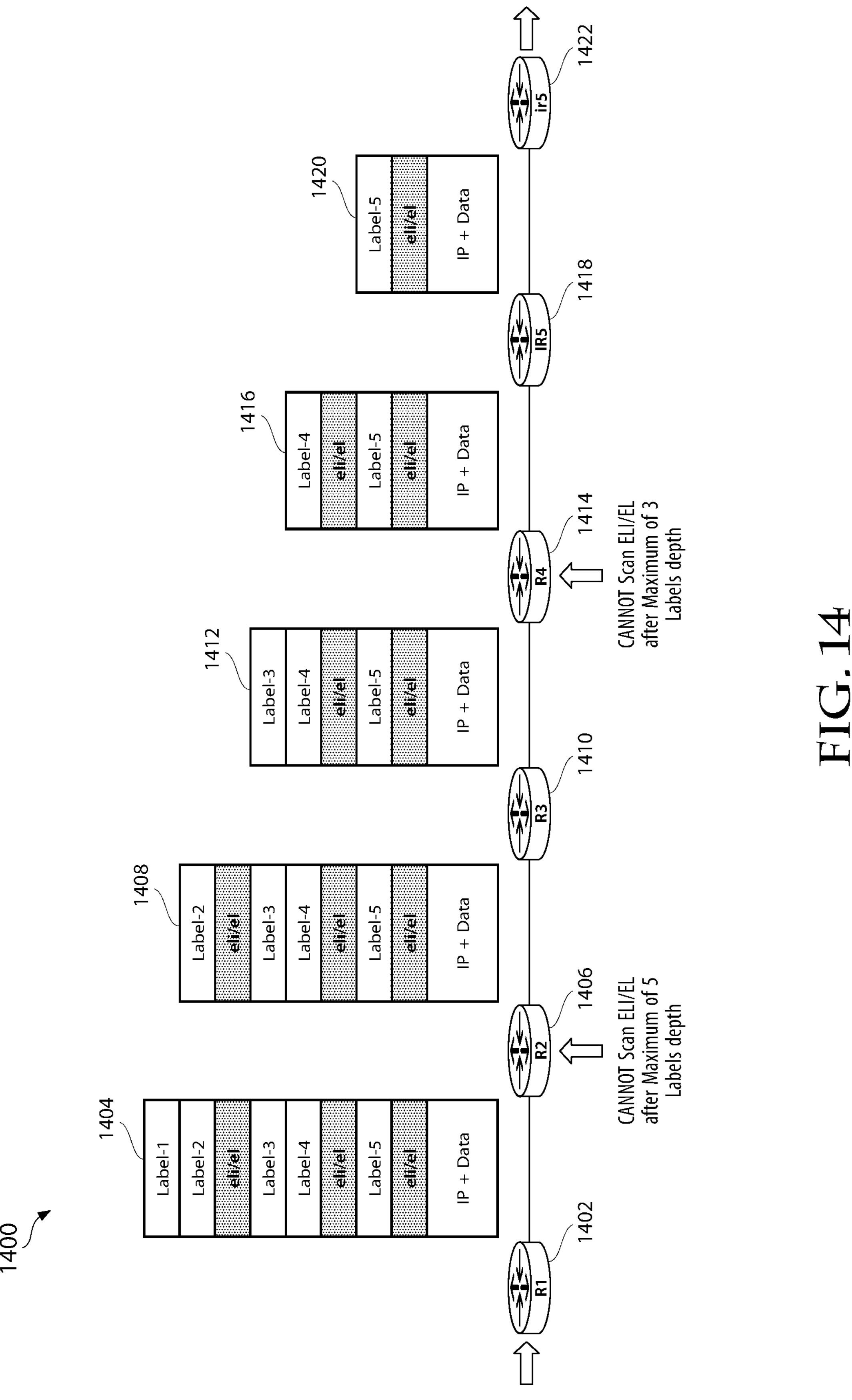
FIG. 14 illustrates how intermediate nodes cannot always scan down to deeper level of the label stock in packet headers in accordance with one embodiment.

Another aspect of this disclosure is illustrated in FIG. 14. Load balancing, or multi-pathing, is an attempt to balance traffic across a network by allowing the traffic to use multiple paths. Load balancing has several benefits: it cases capacity planning, it can help absorb traffic surges by spreading them across multiple paths, and it allows better resilience by offering alternate paths in the event of a link or node failure. As providers scale their networks, they use several techniques to achieve greater bandwidth between nodes. Two widely used techniques are: link aggregation group (LAG) and equal cost multi-path (ECMP). LAG is used to bond together several physical circuits between two adjacent nodes so they appear to higher-layer protocols as a single, higher-bandwidth “virtual” pipe. ECMP is used between two nodes separated by one or more hops, to allow load balancing over several shortest paths in the network. This is typically obtained by arranging IGP metrics such that there are several equal cost paths between source-destination pairs. Both of these techniques may, and often do, coexist in differing parts of a given provider’s network, depending on various choices made by the provider. A requirement when load balancing is that packets belonging to a given “flow” must be mapped to the same path, i.e., the same exact sequence of links across the network. This is to avoid jitter, latency, and reordering issues for the flow. What constitutes a flow varies considerably. A common example of a flow is a TCP (transmission control protocol) session. Other examples are a Layer 2 tunneling protocol (L2TP) session corresponding to a given broadband user or traffic within an ATM (asynchronous transfer mode) virtual circuit. To meet this requirement, a node uses certain fields, termed “keys”, within a packet’s header as input to a load-balancing function (typically a hash function) that selects the path for all packets in a given flow. The keys chosen for the load-balancing function depend on the packet type; a typical set (for IP packets) is the IP source and destination addresses, the protocol type, and (for TCP and UDP (user datagram protocol) traffic) the source and destination port numbers. An overly conservative choice of fields may lead to many flows mapping to the same hash value (and consequently poorer load balancing); an overly aggressive choice may map a flow to multiple values, potentially violating the above requirement. For MPLS networks, most of the same principles (and benefits) apply. However, finding useful keys in a packet for the purpose of load balancing can be more of a challenge. In many cases, MPLS encapsulation may require fairly deep inspection of packets to find these keys at transit label switching routers (LSRs).

One way to eliminate the need for this deep inspection is to have the ingress LSR of an MPLS label switched path extract the appropriate keys from a given packet, input them to its load-balancing function, and place the result in an additional label, termed the "entropy label", as part of the MPLS label stack it pushes onto that packet. The entire label stack of the MPLS packet can then be used by transit LSRs to perform load balancing, as the entropy label introduces the right level of "entropy" into the label stack. There are five key reasons why this is beneficial: 1. At the ingress LSR. MPLS encapsulation hasn't yet occurred, so deep inspection is not necessary; 2. The ingress LSR has more context and information about incoming packets than transit LSRs; 3. Ingress LSRs usually operate at lower bandwidths than transit LSRs, allowing them to do more work per packet; 4. Transit LSRs do not need to perform deep packet inspection and can load balance effectively using only a packet's MPLS label stack; 5. Transit LSRs, not having the full context that an ingress LSR does, have the hard choice between potentially misinterpreting fields in a packet as valid keys for load balancing (causing packet-ordering problems) or adopting a conservative approach (giving rise to sub-optimal load balancing). Entropy labels relieve them of making this choice. The Internet Engineering Task Force (IETF) has described in a request for comment (RFC) 6790 why entropy labels are needed and has defined the general properties of entropy labels, in particular, how they are generated and received and the expected behavior of transit LSRs. The RFC describes in general how signaling works and what needs to be signaled as well as specifics for the signaling of entropy labels for LDP.

In the case of legacy network that is using an MPLS entropy label, the entropy label indicator (ELI) and entropy label (EL) are carried in the MPLS label stack. An entropy label is a special label that enhances a network device's ability to load-balance traffic across an equal-cost multipath (ECMP) path or link aggregation groups (LAGS). A device uses the label to determine a path in place of performed a deep packet inspection (DPI).

After the ingress node 1402, the intermediate nodes 1406, 1410, 1414, 1418 have to scan the MPLS Label stack to find the ELI/EL pair and perform the entropy ECMP operation. The egress node 1422 then receives the packet. Because of the ASICs restrictions, some nodes cannot scan deeper into the MPLS label stack to find the ELI/EL pair and apply the entropy function for ECMP. To support this, RFC 8662 (section 7) allows addition of ELI/EL pair multiple times in the same MPLS label stack. Each ELI/EL pair is duplicated in various places in each stack. But this creates an additional problem on the ingress node 1202 as it needs to impose the large MPLS label stack in hardware with duplicated ELI/EL pairs with some guess work.

There is no mechanism to find the maximum readable segment identifier (SID) depth (MRSD) of each node. For example, a respective node may only be able to look into 52 bytes of the packet header and no further. A segment or segment identifier (SID) can be an instruction a node executes on the incoming packet. The node may forward the packet according to shortest path to destination, or, forward the packet through a specific interface, or, deliver the packet to a given application/service instance. The current way of adding ELI/EL to a stack without knowing the hardware capability of each node 1406, 1410, 1414, 1418 is shown in the system 1400 of FIG. 14. As a packet is processed by a respective node, the node may report that it has been able to scan up to byte 50 or byte 80 of a respective packet header. Only at that point would the OAM probe learn that a respective node does not scan deep enough into a packet header to process all of the information available. To accommodate this limitation, the ELI/EL pair is placed three times in the MPLS stacks 1404, 1408. In FIG. 14, node 1406 cannot scan the third ELI/EL in the stack 1404 because it has a maximum label depth of 5 and the third ELI/EL is below level 5. Stacks 1412, 1416 and 1420 are also configured with one or more ELI/EL on the basis of not knowing the exact hardware capability.

Note that in the MNA framework where features are enabled through the opcodes in the MNA header, that the system needs to know what the maximum label depth is for each node because there may be features or opcodes that are included deeper into the header that in order for those features to be enabled or processed at a respective node, the node needs to able to read or scan that deep into the header.

Figure 15:
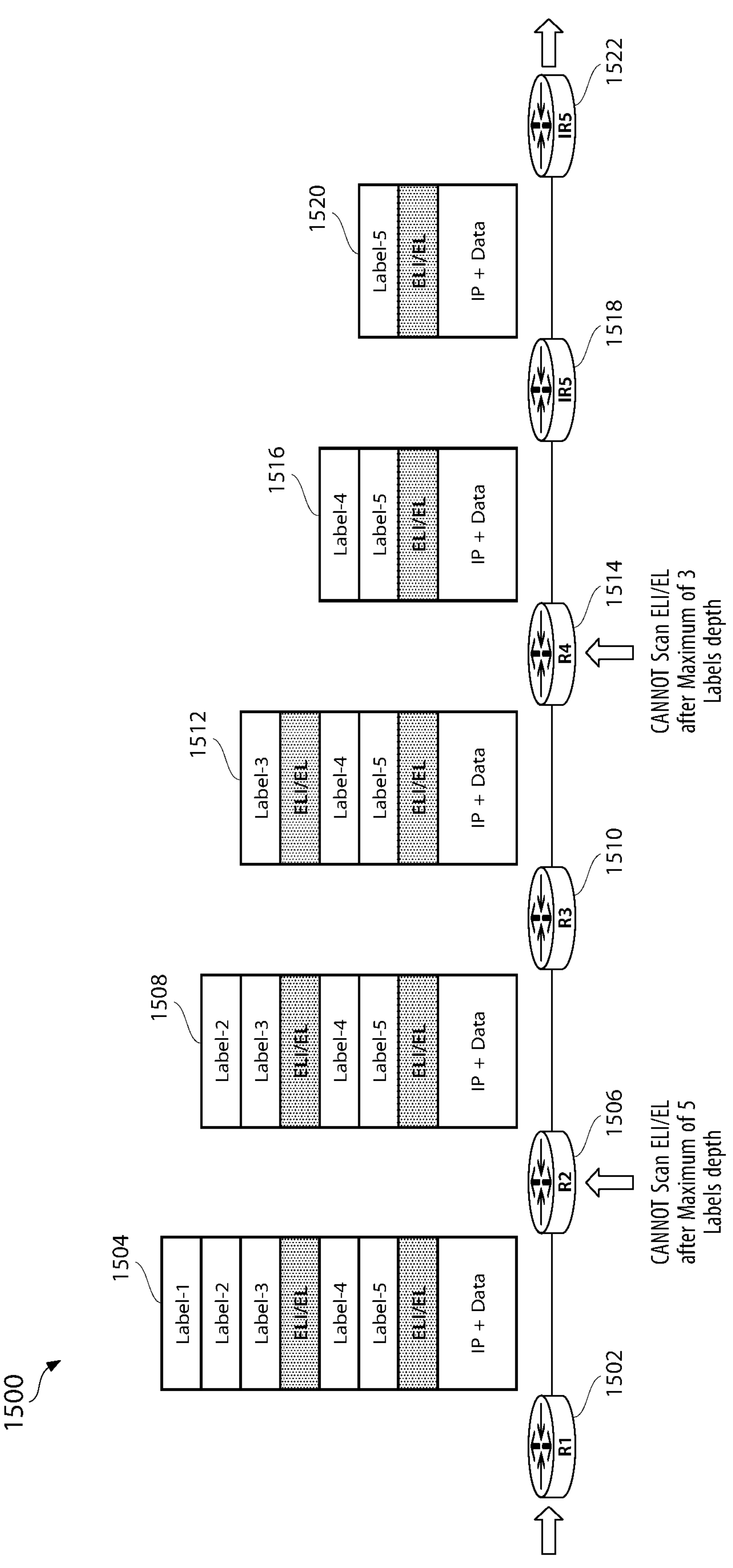
FIG. 15 illustrates an example where each node in a network knows a maximum readable segment identification depth capability in accordance with one embodiment.

If a mechanism existed to find the maximum readable SID depth (MRSD) of each nodes in the path, then the above MPLS label stack 1404 could be optimized as shown in FIG. 15. FIG. 15 illustrates an approach 1500 in which the system knows the hardware capability of what the maximum label depth is for node 1506, 1510, 1514, 1518. Note that stack 1504 only includes two ELI/EL pairs rather than the three pairs in stack 1404 shown in FIG. 14. Knowing the maximum readable SID depth capability of all the nodes in between R1 and R5, the headend node 1502 can optimize (or improve) the total number of ELI/EL pairs in the stacks 1504, 1508, 1512, 1516, 1520 by adding the ELI/EL pair only twice in the stack 1504, 1508, as an example. Note that stack 1516 has a single ELI/EL pair whereas stack 1416 has two ELI/EL pairs.

The new MPLS Network Action (MNA) solution is designed by IETF MPLS Design Team and the new draft which describes an MPLS label stack carrying the application function and associated data in the same manner as ELI/EL pairs, i.e. the opcodes and its corresponding ancillary data are encoded in the label stack and the intermediate nodes needs to scan label stack and fine those opcodes to process those functions. The DETNET, SR and other applications will use this new MNA solution, so this issue will become more serious for many use-cases.

Figure 17:
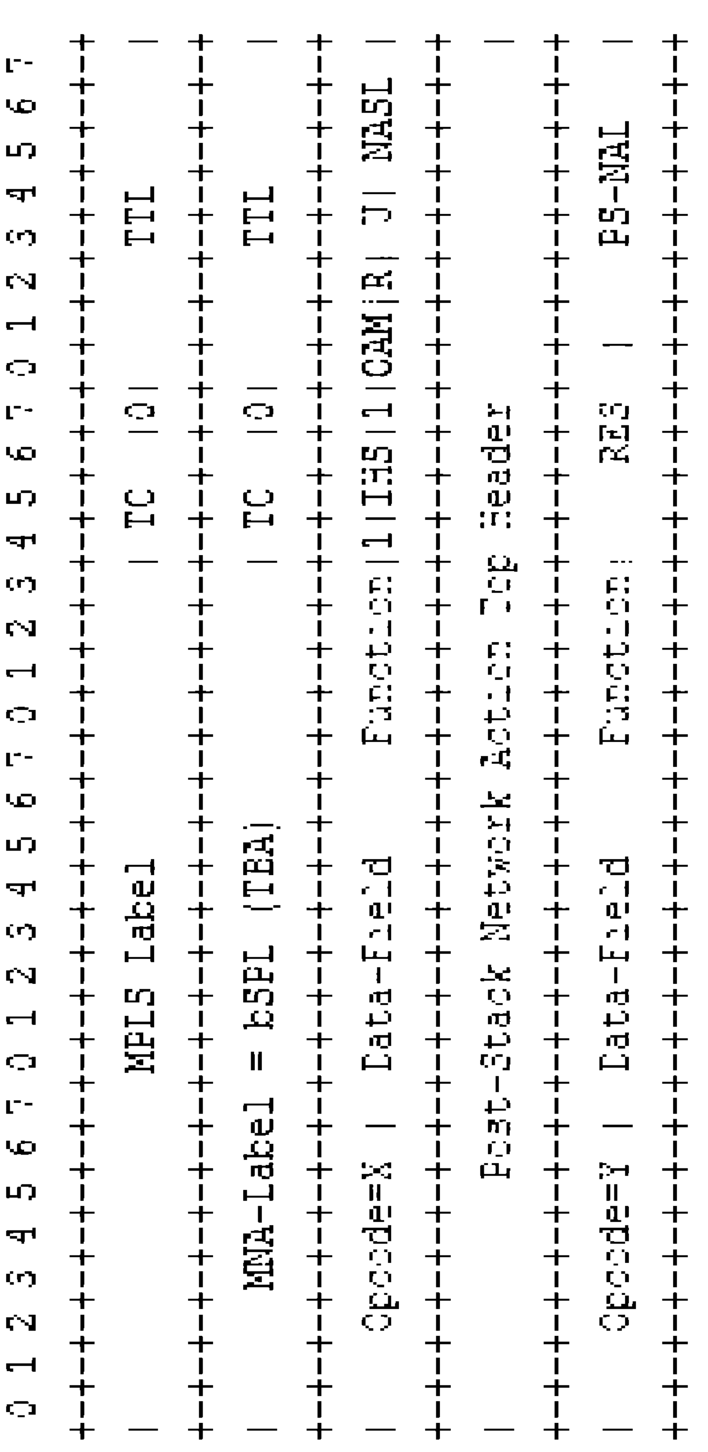
FIG. 17 illustrates opcodes for validating using a post-stack label processing approach in accordance with one embodiment.

In the MNA framework, a maximum SID depth (MSD) is the max number of labels that a node can push. This value is different from the maximum readable SID depth (MRSD) on a midpoint/egress node that has to read and process the MPLS label stack of a packet. The current framework discusses a way to carry the MSD values in the ISIS TLV/Sub-TLVs. Similarly, another approach is about carrying the MSD values in the OSPF TLV/Sub-TLVs. However, neither of these existing approaches disclose a way to validate Maximum Readable SID Depth of a node as it can be hardware and ASIC dependent on each Line Card on the node. The solution is to introduce an OAM for the MNA framework that is new and that solves this problem. The MPLS OAM mechanisms today only does the verification of reachability and forwarding paths. It does not have mechanisms related to the maximum readability SID depth capability discovery and verifications Some terms that may be used in connection with this embodiment include NAS which can stand for a Network Action Sub-Stack. The stack can contain an MNA-Label, NAS parameters and all the encoded Network Actions or opcodes. NASL can stand for a Network Action Sub-Stack Length. This can refer to a length of NAS in the order of LSEs which does not include MNA-Label and the next LSE which encode the NAS Parameters. NA refers to Network Actions and include the NAI-Opcode and Ancillary Data shown in the disclosed stacks. NAL can refer to a Network Action Length or a length of the corresponding Network Action opcode+Ancillary Data. NAL can be used by the node that does not understand the network action or support the network action to skip it and go to the next network action. NAI as noted above refers to a network action indicator. A "P" value can relate to a post-stack network action indicator bit. This bit indicates the presence of post-stack actions in the packet. Sec bit 1704 in FIG. 17. The value of O can represent an ordering bit such as bit 1710 in FIG. 17. This bit can be used to indicate to the hardware node to process the data in order. An "R" bit 1712 can be a reserved bit for future use. The OAM set of bits 1714 are shown in FIG. 17 as well. A packet can carry one or more NAS containing different network actions and different network action processing scope. Copies of the same NAS can be placed at different locations on the MPLS header depending on the MSRD capability of the nodes on the path.

UOH can represent an unknown network action opcode handling which can indicate how to handle the opcode that a node does not understand or support such as to drop the packet or skip the feature and forward the packet without taking specified network action.

The solution for validating and finding the path's maximum readable SID depth (MRSD) uses the MNA solution and the MPLS ping RFC 9041 probe messages. A two-way active measurement protocol (TWAMP) probe described in RFC 8762 is also an option. A bidirectional forwarding detection (BFD) probe described in RFC 5880 is also an option. Another option is a segment routing performance measurement (SR-PM) probe.

The idea of this solution is that the headend node 1802 can use a two-step process to find the intermediate nodes' maximum readable SID depth (MRSD) using probe messages.

In one example a first step can include finding, via the headend 1802, the nodes between the headend node 1802 and the endpoint or egress node 1824 using existing OAM probe packet such as an MPLS OAM. A second step can include allocating a new MNA NAI-opcode called validate label processing (VLP). This opcode instructs the node to process or validate at what label level the node can scan. In one example, the VLP opcode can carry 21 bits (or some other number of bits) of ancillary data. For example, the VLP opcode can include 10 labels or the approach can insert opcodes with different unique values. The headend node 1802 then sends the package through the path or to the set of nodes. The first node 1808 shown in FIG. 18 can read or scan to the MNA-VLP [50]. In this example, the node 1808 can read through the whole stack. The next node 1812 can only read MNA-VLP[20], which identifies that any features or functions requested via an opcode after the label level having the MNA-VLP[20] (i.e., MNA-VLP[30], MNA-VLP [40], MNA-VLP[50]) would not be accessed or processed by that node. Each node 1808, 1812, 18186, 1820 reports back what it could access to the headend node 1802. The headend node 1802 can calculate and can keep track of what each nodes depth reading capability is.

For the purpose of label processing validation, the ancillary data is separated as a data-field and a function-field. A function field carries the type of label function that needs to be validated. The data-field carries the data that would be required to validate the label function. The VLP NAI-opcode network action (VLP) is the opcode reserved for validating the data-paths label processing behavior. Depending on the function-field encoded in the packet the validation of the label processing will be different.

When the function value is set to "0", then the node should optionally or be required to record the last read VLP-opcode and send the value and a copy of the received packet to the CPU (Punt Path) as well as forward the packet downstream if required. When the function value is set to "1", then the Node should or may be required to increment the value in the data-field and forward the packet if required.

The second step described above has two different approaches. In a first aspect, the approach is to add multiple instances of the NAI-opcode VLP (i.e., using a function 0). The approach includes initiating a packet or OAM probe at a headend node 1802. When a headend node needs to find the MRSD of the nodes between itself and its endpoint(s) 1824, then it should find the headend MSD and, depending on the MSD, add the MPLS Label to reach the endpoint 1824 and encode the MNA-label and the VLP NAI-Opcodes, such that it fills the maximum SID depth (MSD) that the headend node 1802 could encode.

Depending on the headend MSD, multiple copies of VLP NAI-opcode can be encoded. Each instance of the VLP NAI-Opcode's "data-field" should be encoded with the unique 8 bits values "validation code". The headend node 1802 routes an MPLS echo request packet 1822 towards the endpoint node 1824.

Next the approach includes processing VLP NAI-Opcodes at a mid-node dataplane (i.e., at each intermediate node 1808, 1812, 1816, 1820). The respective node 1808, 1812, 1816, 1820 scans all the VLP NAI-Opcode in the packet MPLS header. The respective node 1808, 1812, 1816, 1820 records the last read VLP NAI-Opcode (i.e., the one closer to the bottom of the stack) "validation code" from the data-field of the VLP NAI-Opcode. The respective node 1808, 1812, 1816, 1820 sends a copy of the packet and the "validation code" to the local CPU (punt copy) at the same time forwards the packet towards its destination. In one aspect, the approach can include the local information being collected and streamed to a controller via telemetry.

The processing of the VLP NAI-Opcodes at the mid-nodes control-plane (i.e., the respective node 1808, 1812, 1816, 1820) further includes, on receiving the "validation code" and the copy of the received packet, scanning through the packet and find the matching "validation code" in the MPLS header and calculating the "readable depth" where the matching "validation code" is encoded. Each respective node 1808, 1812, 1816, 1820 informs the headend 1802 about the read "validation code".

Another aspect includes several different approaches at this stage. One approach is to encode the MRSD TLV/Sub-TLV in the MPLS echo packet and send the response back from the respective node 1808, 1812, 1816, 1820 to the originator or headend node 1802. In an alternate approach, the respective node 1808, 1812, 1816, 1820 encodes the "validation code" in the "identifier" field of the MPLS echo-reply. This approach does not need an additional MRSD TLV/Sub-TLV. When the headend node 1802 formats the MPLS echo request packet, then it can allocate "base-identifiers" and other "depth-identifiers" for this purpose. In one aspect, a depth-identifier equals a base-identifier+read 8 bit "data-field".

The headend node 1802 can allocate the additional identifier called "depth-identifier" depending on the number of VLP NAI-Opcodes that are encoded and its encoded "validation code" value. The headend node 1802 also maintains the "depth-identifier" vs the MRSD. The responder mid-nodes 1808, 1812, 1816, 1820 can read the latest VLP NAI-Opcode and add a respective "data-field" value to the base-identifier that is already encoded in the MPLS echo request and forward the packet back to the source. Since this approach is a lightweight approach, this could be done easily in the dataplane itself.

In another aspect, the headend node 1802 performs some processing of the responses received from respective intermediate nodes 1808, 1812, 1816, 1820. The received MPLS echo reply packet can contain the MRSD TLV/Sub-TLV. By matching the source-IP and the "readable depth" value in the MRSD TLV/Sub-TLV gives the information for the MRSD values of the intermediate nodes 1808, 1812, 1816, 1820. The headend node 1802 could find the following about the intermediate nodes: (1) a maximum MRSD of the intermediate nodes 1808, 1812, 1816, 1820; (2) If any node is not capable of MNA, then those nodes will not send back the echo-reply, this will indicate that, that node does not support MNA; (3) If the penultimate node 1820 does not support MNA, then the penultimate node 1820 will send the packet with MNA-Label at the top to the endpoint or egress node 1824. As a result, the endpoint or egress node 1824 will send a echo-reply with the MRSD TLV/Sub-TLV towards the headend node 1802.

In another aspect, the headend node 1820 may stream the collected information to a controller. The headend node 1802 can send a single probe and determines the MRSD of the intermediate nodes 1808, 1812, 1816, 1820.

In a second approach, the headend node 1802 may add only one instance of VLP NAI-Opcode (i.e., using Function-0). The NAI-Opcode VLP can be filled in only once in the MPLS stack and multiple NAI-Opcode-126 (No-Operation) are added to fill in the rest of the MPLS depth. The headend node 1802 first tries to probe the nodes with the endpoint label and the NAI-Opcode VLP and record the response of the intermediate nodes 1808, 1812, 1816, 1820. Next, the approach includes increasing the MPLS label stack depth by adding the NAI-Opcode=126 (i.e., the no-operation opcode) after the MNA-Label until the headend node 1802 reaches its maximum SID depth or none of the nodes 1808, 1812, 1816, 1820 responds back for the probe. A benefit of this approach is that the hardware needs to scan the no-op opcode to find the VLP opcode, so this will test the real hardware readable depth capability, whereas in the first approach above, by seeing the first VLP some hardware implementation could choose to punt the packet to the slow path and it would send the message regarding what the CPU feels and not the actual readable depth.

In summary, the mechanism disclosed herein defines a new structure for an MNA OAM probe packet or probe. Based on the headend's MSD, the OAM probe packets encode in the new MNA validate SID processing (VLP) NAI-Opcode and the corresponding unique "validation code" and forward the packets towards the endpoint node 1824. The respective node 1808, 1812, 1816, 1820 which processes the MNA VLP NAI-opcode reads the "validation code" that is encoded (A Novel way of dataplane processing the VLP NAI-opcode and informing the CPU or headend node 1802 about the last "validation code" and forward the copy of the packet to the CPU.

The mid-node 1808, 1812, 1816, 1820 informs the headend node 1802 about the last "validation code" that it processed and keeps forwarding the packet. Based on the last "validation code" that a node can read, the headend node 1802 can decide the maximum MPLS SID depth (MRSD) a node can read/process.

Informing the MRSD value of a respective node 1808, 1812, 1816, 1820 back to the headend node 1802 can be done using a new MRSD TLV/SUB-TLV or the respective node 1808, 1812, 1816, 1820 could inform the headend node 1802 using the "depth-identifier" (i.e., by updating the "identifier" field in the MPLS echo reply) for which headend node 1802 allocates & maintains the mapping between "depth-identifier" and the MRSD.

A controller can be used to send the MRSD information either from the midpoint nodes 1808, 1812, 1816, 1820 via telemetry or from the tailend endpoint 1824 or the headend node 1802 which then can be used to ensure the MPLS header size and the MNA network actions are readable on midpoint nodes 1808, 1812, 1816, 1820.

FIG. 16 illustrates a header 1602 including an MNA NAI-opcode 1608 for validating in-stack labeling processing (VLP). There is an OAM set of bits 1604. There is also a bit value 1606 that indicates the end of the label stack. Note that the opcodes 1608 are before the bit 1606 which indicates the end of the label stack in header 1602.

FIG. 17 illustrates a header 1702 with a label stack bit 1704 indicating the end of the label stack. In this case, there is a post-stack network action top header 1706 also with an opcode 1708 as well as other ancillary data that is post-stack network action. A post-stack writable data depth is a mechanism that can be extended in similar fashion for the post-stack data maximum write depth capability discovery. This may be required for the IOAM and path tracing use-cases for recording timestamps, interface IDs, interface load, node IDs, queue depths, etc. along the path, for example. These use-cases write the requesting information in the post-stack network action ancillary data after the label stack, for example.

Figure 18:
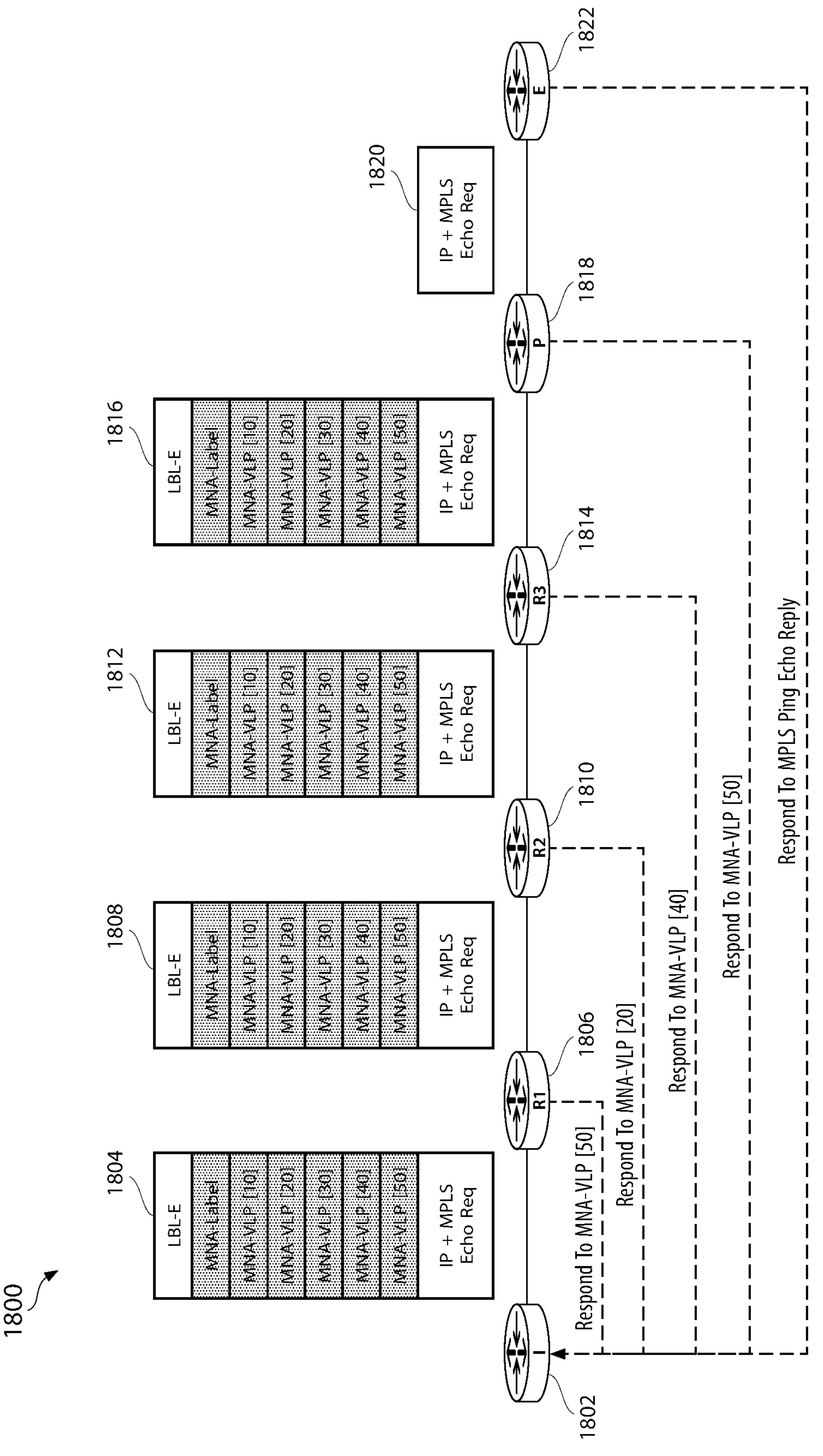
FIG. 18 illustrates using multiple validation label processing (VLP) opcodes in a header of a probe in accordance with one embodiment.

FIG. 18 illustrates the approach introduced above to find a path multicast source discovery protocol (MSDP) using a single scan procedure 1800. This approach includes a headend node 1802 (or other node) adding multiple instances of a validate label processing NAI-opcode to the stack 1804. Note that in this case, each stack 1804, 1810, 1814, 1818 includes the same MNA label and set of instances of the MNA VLP opcode with different values [10]. [20], [030], [40], [50]. The first node 1806 of the set of nodes responds or reports to the headend node 1802 with the data that it was able to read down to MNA-VLP [50]. The next node 1812 reads the stack 1810 and reports to the headend node 1802 that it has read down to MNA-VLP[20]. The next node 1816 reads the stack 1814 down to MNA-VLP[40] and the penultimate node 1820 reads the stack 1818 and reports to the headend node 1802 that it read down to MNA-VLP[50]. The endpoint or egress node 1824 reads the data 1822 and responds to the headend node 1802 with an MPLS ping echo reply. This approach enables the headend node 1802 to learn at what depth each respective node can read and from this data, other information about the capabilities of the path is learned and thus can be used to initiate the use of the path or a different path for an application.

Figure 19:
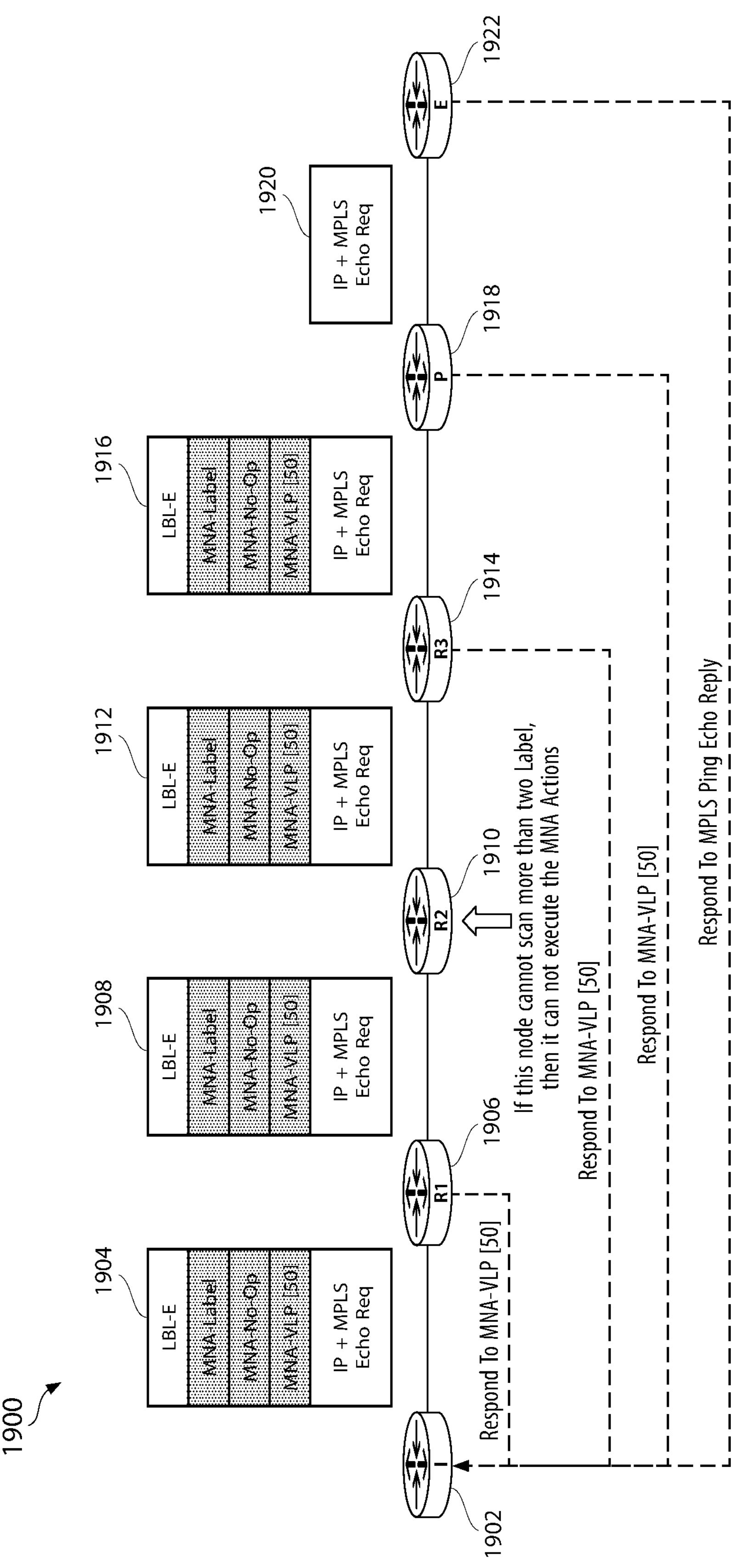
FIG. 19 illustrates using no-operation opcodes in the label stack of the header of a probe in accordance with one embodiment.

FIG. 19 illustrates an approach 1900 for adding only one instance of an VLP NAI-opcode to each stack 1904, 1908, 1912, 1916. Each stack 1904, 1908, 1912, 1916 includes an MPLS echo request, plus an MNA label, MNA no-opcode padding data and one MNA-VLP. This provides an incremental way of testing using MNA no-opcode padding. In this case, the stack 1404 includes an MNA-Label, and MNA no-opcode field and one MNA-VLP[50] data. As the probe or packet is generated by the headend 1902, the first node 1906 responds to the headend node 1902 that it can read the MNA-VLP[50] field. However, the next node 1910 cannot scan more than two labels and thus it cannot execute the MNA actions and does not respond to the headend node 1902 based on processing the stack 1908. The next node 1914 can scan more than two labels of the stack 1912 and can report to the headend 1902 that it read the MNA-VLP [50]. Similarly, the penultimate node 1918 can scan down to the MNA-VLP[50] and reports the same to the headend node 1902. The egress node 1922 responds to the MPLS ping echo reply 1920. These respective node interactions are provided by way of example only. This approach can then infer that node 1910 cannot scan more than two labels as the headend node 1902 did not receive any report from this node. The MNA no-opcode field is a padding field with no opcode included and which is used to test at what label level each node can scan. The process of FIG. 20 will illustrate how the method can be incrementally implemented via starting with one MNA no-op field or data and one MNA-VLP until all the nodes respond, and then adding MAN-no-op fields or data and the one MNA-VLP until at least one of the nodes does not respond.

Figure 20:
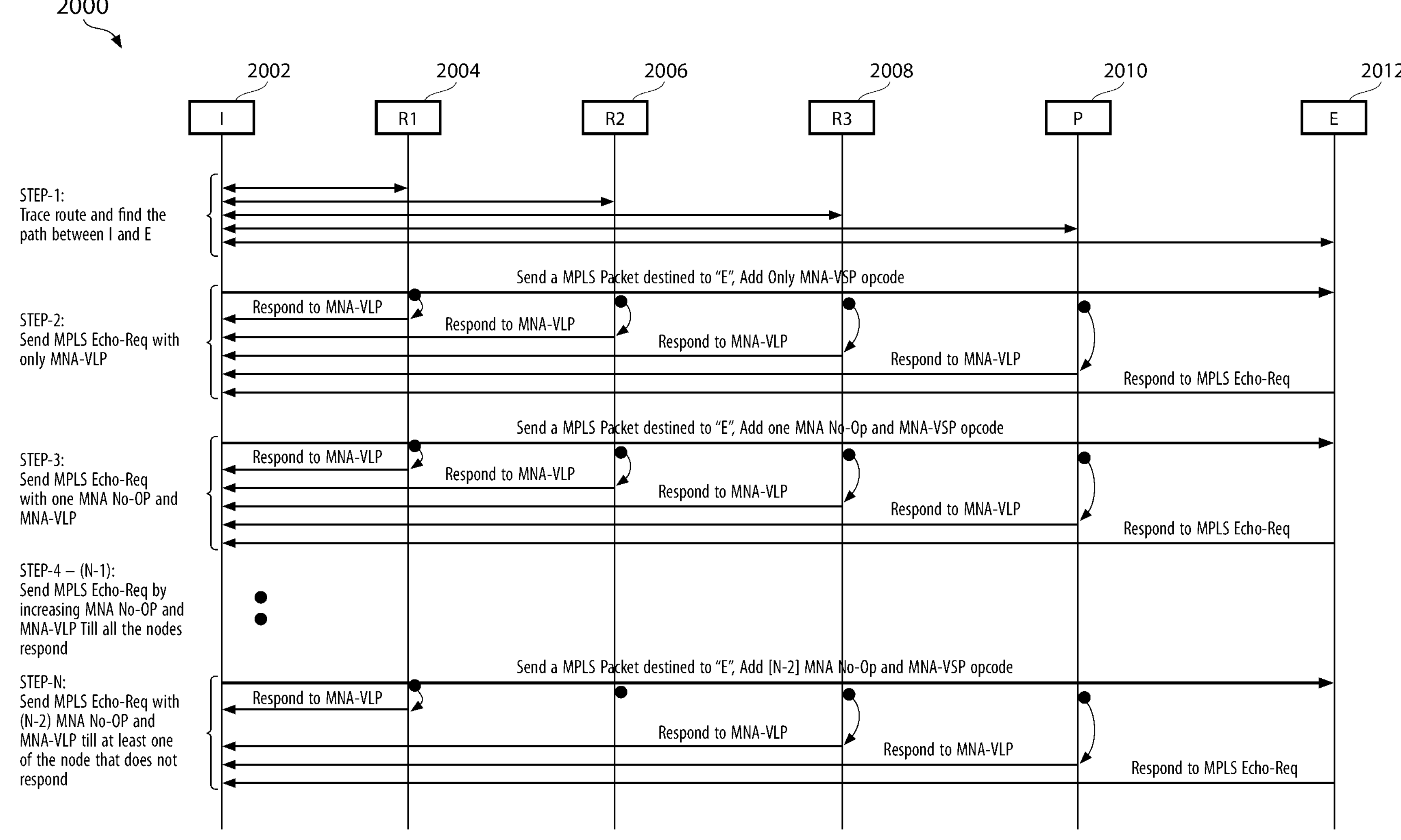
FIG. 20 illustrates an iterative approach of using no-operation opcodes and MNA-VLP opcodes in accordance with one embodiment.

FIG. 20 illustrates a method 2000 to find the path MSDP. This illustrates the specific steps used for the incremental way of testing using MNA-no-op padding in the stack. The first step shown is to start at the ingress or headend node 2002 and trace a route through a set of nodes 2004, 2006, 2008, 2010 to an egress node 2012. The path is thus traced from the ingress node or headend node 2002 and the egress nodes 2012. Step 2 as shown involves each of the nodes 2004, 2006, 2008, 2010 responding to the MNA-VLP and the egress node 2010 responding to an MPLS echo-request. In this step, the stack labels may include one or more MNA-VLPs. However, there is no padding in this step.

Step 3 involves first sending a packet header with one MNA-no-op padding field and one MNA-VLP. Each node 2004, 2006, 2008, 2010 responds to the MNA-VLP and the egress node 2012 responds to the MPLs echo-request. Then, step 4 involves starting to probe which nodes can perform at what level. Here, the iterative step involves increasing the number of MNA no-op padding data and/or MNA-VLPs until all the nodes respond. Step N involves sending the MLPS echo-request with a certain number of MNA no-op padding data and the MNA-VLP until at least one of the nodes does not respond. In this example, assume that there are there MNA-no-op padding labels provided and the MNA-VLP opcode. As shown in FIG. 20, assume that node 2006 does not respond indicating that the node 2006 cannot scan down enough labels to execute the MNA action MNA-VLP opcode. (See also node 1910 in FIG. 19 that could not scan down to the MNA-VLP in stack 1908). In this manner, the system can probe the path of nodes to determine at what label level all of the nodes can scan to execute MNA actions. This information can then be used to confirm that the path will be operable for an application or not.

Figure 21:
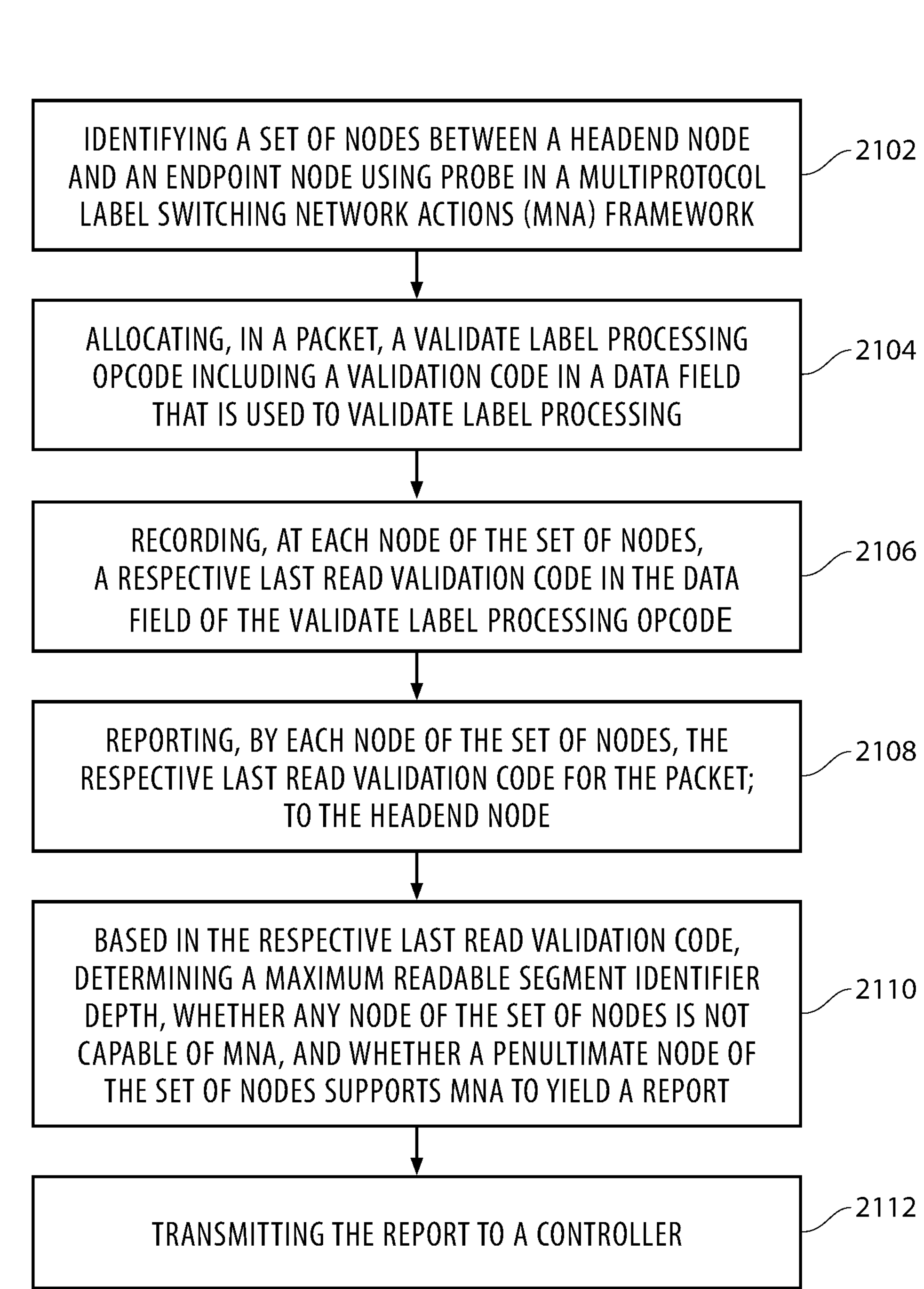
FIG. 21 illustrates a method aspect of the subject matter in accordance with one embodiment.

FIG. 21 illustrates a method 2100 for validating label processing behavior or a method of finding a path maximum readable segment identifier depth. The method can include identifying a set of nodes between a headend node and an endpoint node using probe in a multiprotocol label switching network actions (MNA) framework (2102); allocating, in a packet, a validate label processing opcode including a validation code in a data field that is used to validate label processing (2104); recording, at each node of the set of nodes, a respective last read validation code in the data field of the validate label processing opcode (2106); and reporting, by each node of the set of nodes, the respective last read validation code for the packet; to the headend node (2108). The probe can include an operation, administration and management (OAM) probe or a bidirectional forwarding detection (BFD) probe packet, two-way active measurement protocol (TWAMP) probe. Another probe can be a segment routing performance measurement (SR-PM) probe. The method can further include, based in the respective last read validation code, determining a maximum readable segment identifier depth, whether any node of the set of nodes is not capable of MNA, and whether a penultimate node of the set of nodes supports MNA to yield a report (2110); and optionally transmitting the report to a controller (2112).

The headend encapsulating node upon determining the minimum MRSD along the path, adding one or more copies the MNA sub-stack in the header such that an intermediate node can reach to read the MNA sub-stack as it would not be added too deep into the header. Multiple copies of the MNA sub-stack are added at different depth in the packet to facilitate this. When an MNA sub-stack is received at the top of the header in the packet, the node processes the MNA network actions and then removes the top MNA Sub-stack from the header. The step of reporting the respective last read validation code can be performed through a multiprotocol label switching echo reply packet that contains MRSD data. In one aspect, the MRSD data can include TLV/Sub-TLV (type, length, variable) data.

In another aspect, the step of allocating, in the packet, the validate label processing opcode including the validation code further can include one of (1) allocating an MNA no-operation opcode and a single validate label processing opcode or (2) allocating the MNA no-operation opcode and iteratively adding more MNA no-operation opcodes in the packet to probe which of the set of nodes does not respond to the validate label processing opcode as it is positioned deeper in a label stack of the packet.

In another aspect, the step of allocating, in the packet, the validate label processing opcode including the validation code further can include allocating, in a label stack of the packet, multiple validate label processing opcodes to probe which level of the label stack a respective node of the set of nodes can access.

Figure 22:
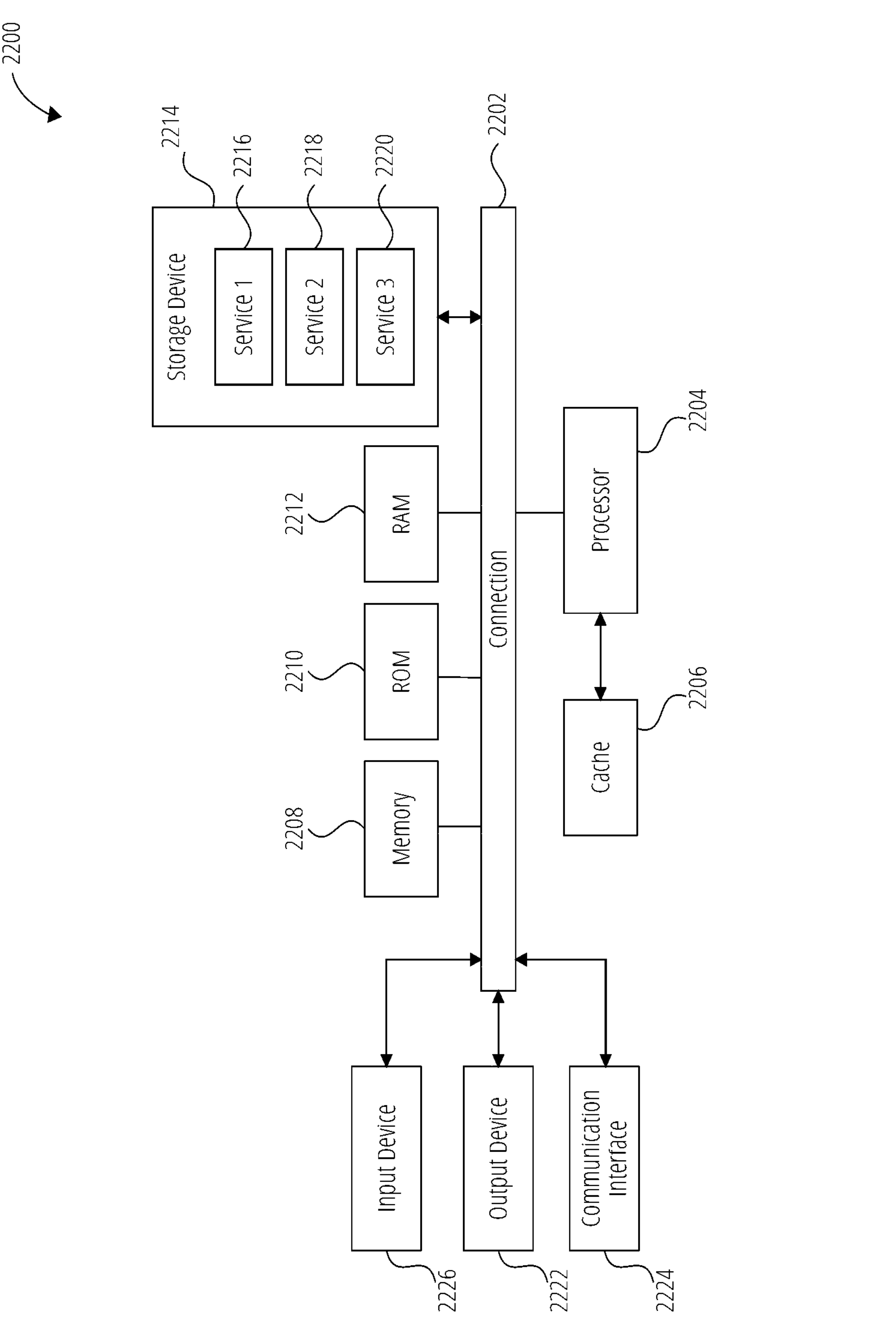
FIG. 22 shows an example of a system for implementing certain aspects of the present technology.

FIG. 22 shows an example of computing system 2200, which can be for example any computing device such as any of the nodes 1202, 1206, 1210, 1214, 1218, 1222, 1226 or any component thereof in which the components of the system are in communication with each other using connection 2202. Connection 2202 can be a physical connection via a bus, or a direct connection into processor 2204, such as in a chipset architecture. Connection 2202 can also be a virtual connection, networked connection, or logical connection.

In some embodiments, computing system 2200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 2200 includes at least one processing unit (CPU or processor) 2204 and connection 2202 that couples various system components including system memory 2208, such as read-only memory (ROM) 2210 and random-access memory (RAM) 2212 to processor 2204. Computing system 2200 can include a cache of high-speed memory 2206 connected directly with, in close proximity to, or integrated as part of processor 2204.

Processor 2204 can include any general-purpose processor and a hardware service or software service, such as services 2216, 2218, and 2220 stored in storage device 2214, configured to control processor 2204 as well as a special-purpose processor where software instructions are incorporated into the actual processor design. Processor 2204 may essentially be a completely self-contained computing system, containing multiple cores or processors, a bus, memory controller, cache, etc. A multi-core processor may be symmetric or asymmetric.

To enable user interaction, computing system 2200 includes an input device 2226, which can represent any number of input mechanisms, such as a microphone for speech, a touch-sensitive screen for gesture or graphical input, keyboard, mouse, motion input, speech, etc. Computing system 2200 can also include output device 2222, which can be one or more of a number of output mechanisms known to those of skill in the art. In some instances, multimodal systems can enable a user to provide multiple types of input/output to communicate with computing system 2200. Computing system 2200 can include communication interface 2224, which can generally govern and manage the user input and system output. There is no restriction on operating on any particular hardware arrangement, and therefore the basic features here may easily be substituted for improved hardware or firmware arrangements as they are developed.

Storage device 2214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 2214 can include software services, servers, services, etc., that when the code that defines such software is executed by the processor 2204, it causes the system to perform a function. In some embodiments, a hardware service that performs a particular function can include the software component stored in a computer-readable medium in connection with the necessary hardware components, such as processor 2204, connection 2202, output device 2222, etc., to carry out the function.

For clarity of explanation, in some instances, the present technology may be presented as including individual functional blocks including functional blocks including devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer-readable media. Such instructions can include, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can include hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

A first set of claim clauses for the first embodiment are as follows:

Clause 1. A method of validating a hardware path capability, the method comprising: generating, at an ingress node of a network, an operations, administration and maintenance (OAM) probe packet having an OAM bit set associated with validating the hardware path capability, wherein the OAM probe packet comprises a plurality of features; indicating, by each respective intermediate node of a plurality of intermediate nodes in the network along a network path and as instructed by the OAM bit set, whether the respective intermediate node can support the respective feature of the plurality of features; generating, at an egress node associated with the network path, a report regarding whether the plurality of intermediate nodes can support each respective feature of the plurality of features within the OAM probe packet; and determining, based on the report, whether to enable customer traffic implementing the plurality of features along the network path.

Clause 2. The method of clause 1, wherein each respective feature of the plurality of features is indicated by a network action indicator operational code.

Clause 3. The method of clause 1, wherein the OAM bit set comprises one to three bits.

Clause 4. The method of clause 3, wherein the OAM bit set determines forwarding behavior for the OAM probe packet.

Clause 5. The method of clause 4, wherein the OAM bit set comprises 00 as a default value, 01 is a read, update and forward value, and 10 is a read, update, copy to CPU and forward value.

Clause 6. The method of clause 1, wherein the OAM probe packet comprises a multiprotocol label switching network actions packet with the OAM bit set.

Clause 7. The method of clause 1, further comprising: when, based on the report, each of the plurality of intermediate nodes supports each of the plurality of features, enabling the customer traffic on the network path; when, based on the report, at least one of the plurality of intermediate nodes does not support each of the plurality of features, not enabling the customer traffic on the network path; and when, based on the report, each of the plurality of the intermediate nodes supports a maximum readable segment depth (MRSD) of the plurality of features, enabling the customer traffic on the network path.

Clause 8. The method of clause 1, wherein indicating, by each respective intermediate node of the plurality of intermediate nodes in the network along the network path and as instructed by the OAM bit set, whether the respective intermediate node can support the respective feature of the plurality of features further comprises incrementing a counter for each respective intermediate node that supports each respective feature of the plurality of features.

Clause 9. The method of clause 1, wherein whether the respective intermediate node can support the respective feature of the plurality of features is stored in the OAM probe packet in an ancillary data field.

Clause 10. The method of clause 9, wherein the report is generated at the egress node based on a time to live value in the OAM probe packet.

Clause 11. The method of clause 9, further comprising: determining a feature capability of specific intermediate nodes of the plurality of intermediate nodes by setting the OAM bit set to 10; incrementing a time to live (TTL) value at each respective intermediate node of the plurality of intermediate nodes; receiving, at the ingress node and from each respective intermediate node based on the OAM bit set at a value, a respective return value of a multiprotocol label switching network action opcode ancillary value stored in the ancillary data field of the OAM probe packet; and determining, at the ingress node and based on the respective return value of a multiprotocol label switching network action opcode ancillary value, which respective intermediate node is not incrementing the multiprotocol label switching network action opcode ancillary value stored in the ancillary data field of the OAM probe packet for a specific feature of the plurality of features.

Clause 12. The method of clause 1, wherein the OAM bit set is in a header configured according to a multiprotocol label switching network actions framework.

Clause 13. A system for validating a hardware path capability, the system having a plurality of intermediate nodes in a network, the system comprising: at least one processor; and a computer-readable storage medium storing instructions which, when executed by the at least one processor, cause the at least one processor to perform operations comprising: generating an operations, administration and maintenance (OAM) probe packet having an OAM bit set associated with validating a hardware path capability, wherein the OAM probe packet comprises a plurality of features; indicating, by each respective intermediate node of the plurality of intermediate nodes in the network along a network path and as instructed by the OAM bit set, whether the respective intermediate node can support the respective feature of the plurality of features; generating a report regarding whether the plurality of intermediate nodes can support each respective feature of the plurality of features within the OAM probe packet; and determining, based on the report, whether to enable customer traffic implementing the plurality of features along the network path.

Clause 14. The system of clause 13, wherein each respective feature of the plurality of features is indicated by a network action indicator operational code.

Clause 15. The system of clause 13, wherein the OAM bit set comprises one to three bits.

Clause 16. The system of clause 15, wherein the OAM bit set determines forwarding behavior for the OAM probe packet.

Clause 17. The system of clause 16, wherein the OAM bit set comprises 00 as a default value, 01 is a read, update and forward value, and 10 is a read, update, copy to CPU and forward value.

Clause 18. The system of clause 13, wherein the OAM probe packet comprises a multiprotocol label switching network actions packet with the OAM bit set.

Clause 19. The system of clause 13, wherein the computer-readable storage medium stores further instructions which, when executed by the at least one processor, cause the at least one processor to perform operations further comprising: when, based on the report, each of the plurality of intermediate nodes supports each of the plurality of features, enabling the customer traffic on the network path; when, based on the report, at least one of the plurality of intermediate nodes does not support each of the plurality of features, not enabling the customer traffic on the network path; and when, based on the report, each of the plurality of the intermediate nodes supports a maximum readable segment identifier (MRSID) depth of the plurality of features, enabling the customer traffic on the network path.

Clause 20. The system of clause 13, wherein indicating, by each respective intermediate node of the plurality of intermediate nodes in the network along the network path and as instructed by the OAM bit set, whether the respective intermediate node can support the respective feature of the plurality of features further comprises incrementing a counter for each respective intermediate node that supports each respective feature of the plurality of features.

Clause 21. The system of clause 13, wherein whether the respective intermediate node can support the respective feature of the plurality of features is stored in the OAM probe packet in an ancillary data field.

Clause 22. The system of clause 21, wherein the report is generated at the egress node based on a time to live value in the OAM probe packet.

Clause 23. The system of clause 21, wherein the computer-readable storage medium stores further instructions which, when executed by the at least one processor, cause the at least one processor to perform operations further comprising: determining a feature capability of specific intermediate nodes of the plurality of intermediate nodes by setting the OAM bit set to 10; incrementing a time to live (TTL) value at each respective intermediate node of the plurality of intermediate nodes; receiving, at the ingress node and from each respective intermediate node based on the OAM bit set at a value, a respective return value of a multiprotocol label switching network action opcode ancillary value stored in the ancillary data field of the OAM probe packet; and determining, at the ingress node and based on the respective return value of a multiprotocol label switching network action opcode ancillary value, which respective intermediate node is not incrementing the multiprotocol label switching network action opcode ancillary value stored in the ancillary data field of the OAM probe packet for a specific feature of the plurality of features.

Clause 24. The system of clause 13, wherein the OAM bit set is in a header configured according to a multiprotocol label switching network actions framework.

Clause 25. A computer-readable storage medium storing instructions for validating a hardware path capability which, when executed by at least one processor, cause the at least one processor to perform operations comprising: generating an operations, administration and maintenance (OAM) probe packet having an OAM bit set associated with validating a hardware path capability, wherein the OAM probe packet comprises a plurality of features; indicating, by each respective intermediate node of a plurality of intermediate nodes in a network along a network path and as instructed by the OAM bit set, whether the respective intermediate node can support the respective feature of the plurality of features; generating a report regarding whether the plurality of intermediate nodes can support each respective feature of the plurality of features within the OAM probe packet; and determining, based on the report, whether to enable customer traffic implementing the plurality of features along the network path.

A second set of claim clauses for the second embodiment are as follows:

Clause 1. A method of finding a path maximum readable segment identifier depth, the method comprising: identifying a set of nodes between a headend node and an endpoint node using probe in a multiprotocol label switching network actions (MNA) framework; allocating, in a packet, a validate label processing opcode comprising a validation code in a data field that is used to validate label processing; recording, at each node of the set of nodes, a respective last read validation code in the data field of the validate label processing opcode; and reporting, by each node of the set of nodes, the respective last read validation code for the packet; to the headend node.

Clause 2. The method of clause 1, wherein the probe comprises an operation, administration and management (OAM) probe or a segment routing performance measurement (SR-PM) probe or a two-way active measurement protocol (TWAMP) probe.

Clause 3. The method of clause 1, further comprising: based in the respective last read validation code, determining a maximum readable segment identifier depth, whether any node of the set of nodes is not capable of MNA, and whether a penultimate node of the set of nodes supports MNA to yield a report; and transmitting the report to a controller.

Clause 4. The method of clause 1, wherein reporting the respective last read validation code is performed through a multiprotocol label switching echo reply packet that contains maximum readable segment depth (MRSD) data.

Clause 5. The method of clause 4, wherein the MRSD data comprises TLV/Sub-TLV (type, length, variable) data.

Clause 6. The method of clause 1, wherein allocating, in the packet, the validate label processing opcode comprising the validation code further comprises one of (1) allocating an MNA no-operation opcode and a single validate label processing opcode or (2) allocating the MNA no-operation opcode and iteratively adding more MNA no-operation opcodes in the packet to probe which of the set of nodes does not respond to the validate label processing opcode as it is positioned deeper in a label stack of the packet.

Clause 7. The method of clause 1, wherein allocating, in the packet, the validate label processing opcode comprising the validation code further comprises allocating, in a label stack of the packet, multiple validate label processing opcodes to probe which level of the label stack a respective node of the set of nodes can access.

Clause 1. A method of finding a path maximum readable segment identifier depth, the method comprising: identifying a set of nodes between a headend node and an endpoint node using probe in a multiprotocol label switching network actions (MNA) framework; allocating, in a packet, a validate label processing opcode comprising a validation code in a data field that is used to validate label processing; recording, at each node of the set of nodes, a respective last read validation code in the data field of the validate label processing opcode; and reporting, by each node of the set of nodes, the respective last read validation code for the packet; to the headend node.

Clause 2. The method of clause 1, wherein the probe comprises an operation, administration and management (OAM) probe or a segment routing performance measurement (SR-PM) probe or a two-way active measurement protocol (TWAMP) probe.

Clause 3. The method of clause 1, further comprising: based in the respective last read validation code, determining a maximum readable segment identifier depth, whether any node of the set of nodes is not capable of MNA, and whether a penultimate node of the set of nodes supports MNA to yield a report; and transmitting the report to a controller.

Clause 4. The method of clause 1, wherein reporting the respective last read validation code is performed through a multiprotocol label switching echo reply packet that contains maximum readable segment depth (MRSD) data.

Clause 5. The method of clause 4, wherein the MRSD data comprises TLV/Sub-TLV (type, length, variable) data.

Clause 6. The method of clause 1, wherein allocating, in the packet, the validate label processing opcode comprising the validation code further comprises one of (1) allocating an MNA no-operation opcode and a single validate label processing opcode or (2) allocating the MNA no-operation opcode and iteratively adding more MNA no-operation opcodes in the packet to probe which of the set of nodes does not respond to the validate label processing opcode as it is positioned deeper in a label stack of the packet.

Clause 7. The method of clause 1, wherein allocating, in the packet, the validate label processing opcode comprising the validation code further comprises allocating, in a label stack of the packet, multiple validate label processing opcodes to probe which level of the label stack a respective node of the set of nodes can access.

Clause 8. A system for validating a hardware path capability, the system having a plurality of intermediate nodes in a network, the system comprising: at least one processor; and a computer-readable storage medium storing instructions which, when executed by the at least one processor, cause the at least one processor to perform operations comprising: identifying a set of nodes between a headend node and an endpoint node using probe in a multiprotocol label switching network actions (MNA) framework; allocating, in a packet, a validate label processing opcode comprising a validation code in a data field that is used to validate label processing; recording, at each node of the set of nodes, a respective last read validation code in the data field of the validate label processing opcode; and reporting, by each node of the set of nodes, the respective last read validation code for the packet; to the headend node.

Clause 9. The system of clause 8, wherein the probe comprises an operation, administration and management (OAM) probe or two-way active measurement protocol (TWAMP) probe or a bidirectional forwarding detection (BFD) probe.

Clause 10. The system of clause 8, wherein the computer-readable storage medium stores further instructions which, when executed by the at least one processor, cause the at least one processor to perform operations further comprising: based in the respective last read validation code, determining a maximum readable segment identifier depth, whether any node of the set of nodes is not capable of MNA, and whether a penultimate node of the set of nodes supports MNA to yield a report; and transmitting the report to a controller.

Clause 11. The system of clause 8, wherein reporting the respective last read validation code is performed through a multiprotocol label switching echo reply packet that contains maximum readable segment depth (MRSD) data.

Clause 12. The system of clause 11, wherein the MRSD data comprises TLV/Sub-TLV (type, length, variable) data.

Clause 13. The system of clause 8, wherein allocating, in the packet, the validate label processing opcode comprising the validation code further comprises one of (1) allocating an MNA no-operation opcode and a single validate label processing opcode or (2) allocating the MNA no-operation opcode and iteratively adding more MNA no-operation opcodes in the packet to probe which of the set of nodes does not respond to the validate label processing opcode as it is positioned deeper in a label stack of the packet.

Clause 14. The system of clause 8, wherein allocating, in the packet, the validate label processing opcode comprising the validation code further comprises allocating, in a label stack of the packet, multiple validate label processing opcodes to probe which level of the label stack a respective node of the set of nodes can access.

Clause 15. A computer-readable storage medium storing instructions for validating a hardware path capability which, when executed by at least one processor, cause the at least one processor to perform operations comprising: identifying a set of nodes between a headend node and an endpoint node using probe in a multiprotocol label switching network actions (MNA) framework; allocating, in a packet, a validate label processing opcode comprising a validation code in a data field that is used to validate label processing; recording, at each node of the set of nodes, a respective last read validation code in the data field of the validate label processing opcode; and reporting, by each node of the set of nodes, the respective last read validation code for the packet; to the headend node.

Clause 16. The computer-readable storage medium of clause 15, wherein the probe comprises an operation, administration and management (OAM) probe or a two-way active measurement protocol (TWAMP) probe or a bidirectional forwarding detection (BFD) probe Clause 17. The computer-readable storage medium of clause 15, wherein the computer-readable storage medium stores further instructions which, when executed by the at least one processor, cause the at least one processor to perform operations further comprising: based in the respective last read validation code, determining a maximum readable segment identifier depth, whether any node of the set of nodes is not capable of MNA, and whether a penultimate node of the set of nodes supports MNA to yield a report; and transmitting the report to a controller.

Clause 18. The computer-readable storage medium of clause 15, wherein reporting the respective last read validation code is performed through a multiprotocol label switching echo reply packet that contains maximum readable segment depth (MRSD) data.

Clause 19. The computer-readable storage medium of clause 18, wherein the MRSD data comprises TLV/Sub-TLV (type, length, variable) data.

Clause 20. The computer-readable storage medium of clause 15, wherein allocating, in the packet, the validate label processing opcode comprising the validation code further comprises one of (1) allocating an MNA no-operation opcode and a single validate label processing opcode or (2) allocating the MNA no-operation opcode and iteratively adding more MNA no-operation opcodes in the packet to probe which of the set of nodes does not respond to the validate label processing opcode as it is positioned deeper in a label stack of the packet.

Clause 21. The computer-readable storage medium of clause 15, wherein allocating, in the packet, the validate label processing opcode comprising the validation code further comprises allocating, in a label stack of the packet, multiple validate label processing opcodes to probe which level of the label stack a respective node of the set of nodes can access.

Clause 22. A method of validating a hardware path capability, the method comprising:

generating, at an ingress node of a network, an operations, administration and maintenance (OAM) probe packet having an OAM bit set associated with validating the hardware path capability, wherein the OAM probe packet comprises a plurality of features;

indicating, by each respective intermediate node of a plurality of intermediate nodes in the network along a network path and as instructed by the OAM bit set, whether the respective intermediate node can support the respective feature of the plurality of features;

generating, at an egress node associated with the network path, a report regarding whether the plurality of intermediate nodes can support each respective feature of the plurality of features within the OAM probe packet;

determining, based on the report, whether to enable customer traffic implementing the plurality of features along the network path; and when, based on the report, each of the plurality of the intermediate nodes supports a maximum readable segment identifier (MRSID) depth or maximum readable segment depth (MRSD) of the plurality of features, enabling the customer traffic on the network path.

Clause 23. A method of validating a hardware path capability, the method comprising:

generating, at an ingress node of a network, an operations, administration and maintenance (OAM) probe packet having an OAM bit set associated with validating the hardware path capability, wherein the OAM probe packet comprises data associated with dropping or skipping the OAM probe packet by a node when the node does not support a feature of the OAM probe packet; and causing, by each respective intermediate node of a plurality of intermediate nodes in the network along a network path and as instructed by the OAM bit set, the respective intermediate node to: drop the OAM probe packet if the respective intermediate node does not support the feature of the OAM probe packet or skip the OAM probe packet and proceed to a next probe packet if the respective node does not support the feature of the OAM probe packet.

Clause 24. A method of validating a hardware path capability, the method comprising:

generating, at an ingress node of a network, an operations, administration and maintenance (OAM) probe packet having an OAM bit set associated with validating the hardware path capability, wherein the OAM probe packet comprises data associated with determining a scope of network access with respect to a maximum readable segment depth associated with the OAM probe packet by each respective intermediate node of a plurality of intermediate nodes in the network along a network path;

identifying, by each respective intermediate node of the plurality of intermediate nodes in the network along the network path and as instructed by the OAM bit set, the respective intermediate node; and reporting, from one or more of nodes of the network path, to the ingress node regarding a respective scope of network access with respect to the maximum readable segment depth to determine whether the network path is usable for an application implementing features identified in the OAM probe packet.

What is claimed is:

1. A method of validating a hardware path capability, the method comprising:

generating, at an ingress node of a network, an operations, administration and maintenance (OAM) probe packet encoded according to a multiprotocol label switching extension header that includes network-action fields defining operation codes and associated ancillary data associated with validating the hardware path capability, wherein the OAM probe packet comprises a plurality of features;

indicating, by a respective intermediate node of a plurality of intermediate nodes in the network along a network path and as instructed by the OAM probe packet, whether the respective intermediate node can support a respective feature identified by a network-action opcode of the plurality of features;

generating, at an egress node associated with the network path, a report regarding whether the plurality of intermediate nodes can support each respective feature of the plurality of features within the OAM probe packet; and determining, based on the report, whether to enable customer traffic implementing the plurality of features along the network path, wherein the OAM probe packet is used to validate a hardware capability of the network path by determining, for each node, a hardware-specific constraint associated with a maximum readable label-stack depth, an opcode execution support or an ancillary-data field recognition capability.

2. The method of claim 1, wherein each respective feature of the plurality of features is indicated by a network action indicator operational code.

3. The method of claim 1, wherein the OAM probe packet comprises one to three bits.

4. The method of claim 3, wherein the OAM probe packet determines forwarding behavior for the OAM probe packet.

5. The method of claim 4, wherein the OAM probe packet one or more of a default value, a read, update and forward value, and a read, update, copy to CPU and forward value.

6. The method of claim 1, wherein the OAM probe packet comprises a multiprotocol label switching network actions packet.

7. The method of claim 1, further comprising:

when, based on the report, each of the plurality of intermediate nodes supports each of the plurality of features, enabling the customer traffic on the network path;

when, based on the report, at least one of the plurality of intermediate nodes does not support each of the plurality of features, not enabling the customer traffic on the network path; and when, based on the report, each of the plurality of intermediate nodes supports a maximum readable segment depth (MRSD) of the plurality of features, enabling the customer traffic on the network path.

8. The method of claim 1, wherein indicating, by each respective intermediate node of the plurality of intermediate nodes in the network along the network path and as instructed by the OAM probe packet, whether the respective intermediate node can support the respective feature of the plurality of features further comprises incrementing a counter for each respective intermediate node that supports each respective feature of the plurality of features.

9. The method of claim 1, wherein whether the respective intermediate node can support the respective feature of the plurality of features is stored in the OAM probe packet in an ancillary data field.

10. The method of claim 9, wherein the report is generated at the egress node based on a time to live value in the OAM probe packet.

11. The method of claim 9, further comprising:

determining a feature capability of specific intermediate nodes of the plurality of intermediate nodes by setting the OAM probe packet to a value;

incrementing a time to live (TTL) value at each respective intermediate node of the plurality of intermediate nodes;

receiving, at the ingress node and from each respective intermediate node based on the OAM probe packet at the value, a respective return value of a multiprotocol label switching network action opcode ancillary value stored in the ancillary data field of the OAM probe packet; and determining, at the ingress node and based on the respective return value of a multiprotocol label switching network action opcode ancillary value, which respective intermediate node is not incrementing the multiprotocol label switching network action opcode ancillary value stored in the ancillary data field of the OAM probe packet for a specific feature of the plurality of features.

12. The method of claim 1, wherein the OAM probe packet is in a header configured according to a multiprotocol label switching network actions framework.

13. A system for validating a hardware path capability, the system having a plurality of intermediate nodes in a network, the system comprising:

at least one processor; and a computer-readable storage medium storing instructions which, when executed by the at least one processor, cause the at least one processor to perform operations comprising:

generating an operations, administration and maintenance (OAM) probe packet encoded according to a multiprotocol label switching extension header that includes network-action fields defining operation codes and associated ancillary data associated with validating the hardware path capability, wherein the OAM probe packet comprises a plurality of features;

indicating, by a respective intermediate node of the plurality of intermediate nodes in the network along a network path and as instructed by the OAM probe packet, whether the respective intermediate node can support a respective feature identified by a network-action opcode of the plurality of features;

generating a report regarding whether the plurality of intermediate nodes can support each respective feature of the plurality of features within the OAM probe packet; and determining, based on the report, whether to enable customer traffic implementing the plurality of features along the network path, wherein the OAM probe packet is used to validate a hardware capability of the network path by determining, for each node, a hardware-specific constraint associated with a maximum readable label-stack depth, an opcode execution support or an ancillary-data field recognition capability.

14. The system of claim 13, wherein each respective feature of the plurality of features is indicated by a network action indicator operational code; wherein the OAM probe packet comprises from one to three bits and wherein the OAM probe packet determines forwarding behavior for the OAM probe packet.

15. The system of claim 14, wherein the OAM probe packet represents one or more of a default value, a read, update and forward value, and a read, update, copy to CPU and forward value.

16. The system of claim 13, wherein the OAM probe packet comprises a multiprotocol label switching network actions packet with the OAM probe packet and wherein the computer-readable storage medium stores further instructions which, when executed by the at least one processor, cause the at least one processor to perform operations further comprising:

when, based on the report, each of the plurality of intermediate nodes supports each of the plurality of features, enabling the customer traffic on the network path; and when, based on the report, at least one of the plurality of intermediate nodes does not support each of the plurality of features, not enabling the customer traffic on the network path.

17. The system of claim 13, wherein indicating, by each respective intermediate node of the plurality of intermediate nodes in the network along the network path and as instructed by the OAM probe packet, whether the respective intermediate node can support the respective feature of the plurality of features further comprises incrementing a counter for each respective intermediate node that supports each respective feature of the plurality of features, wherein whether the respective intermediate node can support the respective feature of the plurality of features is stored in the OAM probe packet in an ancillary data field and wherein the report is generated at an egress node based on a time to live value in the OAM probe packet.

18. The system of claim 17, wherein the computer-readable storage medium stores further instructions which, when executed by the at least one processor, cause the at least one processor to perform operations further comprising:

determining a feature capability of specific intermediate nodes of the plurality of intermediate nodes by setting the OAM probe packet to a value;

incrementing a time to live (TTL) value at each respective intermediate node of the plurality of intermediate nodes;

receiving, at an ingress node and from each respective intermediate node based on the OAM probe packet at the value, a respective return value of a multiprotocol label switching network action opcode ancillary value stored in the ancillary data field of the OAM probe packet; and determining, at the ingress node and based on the respective return value of a multiprotocol label switching network action opcode ancillary value, which respective intermediate node is not incrementing the multiprotocol label switching network action opcode ancillary value stored in the ancillary data field of the OAM probe packet for a specific feature of the plurality of features.

19. The system of claim 13, wherein the OAM probe packet is in a header configured according to a multiprotocol label switching network actions framework.

20. A non-transitory computer-readable storage medium storing instructions for validating a hardware path capability which, when executed by at least one processor, cause the at least one processor to perform operations comprising:

generating an operations, administration and maintenance (OAM) probe packet encoded according to a multiprotocol label switching extension header that includes network-action fields defining operation codes and associated ancillary data associated with validating the hardware path capability, wherein the OAM probe packet comprises a plurality of features;

indicating, by a respective intermediate node of a plurality of intermediate nodes in the network along a network path and as instructed by the OAM probe packet, whether the respective intermediate node can support a respective feature identified by a network-action opcode of the plurality of features;

generating a report regarding whether the plurality of intermediate nodes can support each respective feature of the plurality of features within the OAM probe packet; and determining, based on the report, whether to enable customer traffic implementing the plurality of features along the network path, wherein the OAM probe packet is used to validate a hardware capability of the network path by determining, for each node, a hardware-specific constraint associated with a maximum readable label-stack depth, an opcode execution support or an ancillary-data field recognition capability.

* * * * *